(12) United States Patent
Teevan et al.

(10) Patent No.: US 9,424,354 B2
(45) Date of Patent: Aug. 23, 2016

(54) PROVIDING CROWDSOURCED ANSWERS TO INFORMATION NEEDS PRESENTED BY SEARCH ENGINE AND SOCIAL NETWORKING APPLICATION USERS

(71) Applicant: Microsoft Corporation, Redmond, WA (US)

(72) Inventors: Jaime Teevan, Bellevue, WA (US); Susan T. Dumais, Kirkland, WA (US); Michael S. Bernstein, Stanford, CA (US); Eric Horvitz, kirkland, WA (US); Meredith Morris, Bellevue, WA (US); Jin-Woo Jeong, Seoul (KR); Daniel Liebling, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 341 days.

(21) Appl. No.: 13/831,872

(22) Filed: Mar. 15, 2013

(65) Prior Publication Data

US 2014/0279996 A1    Sep. 18, 2014

(51) Int. Cl.
G06F 17/30    (2006.01)

(52) U.S. Cl.
CPC .... *G06F 17/30864* (2013.01); *G06F 17/30722* (2013.01)

(58) Field of Classification Search
CPC .................... G06F 17/30864; G06F 17/30722
USPC ........................................................ 707/706
See application file for complete search history.

(56) References Cited

U.S. PATENT DOCUMENTS

| | | | | |
|---|---|---|---|---|
| 8,788,517 | B2 * | 7/2014 | Horvitz et al. | 707/759 |
| 8,825,701 | B2 * | 9/2014 | Ceri | G06F 17/30864 |
| | | | | 707/779 |
| 9,098,808 | B1 * | 8/2015 | Ventilla | G06N 5/04 |
| 2006/0106788 | A1 * | 5/2006 | Forrest | 707/4 |
| 2011/0106746 | A1 * | 5/2011 | Ventilla | G06Q 10/10 |
| | | | | 706/50 |
| 2011/0106895 | A1 * | 5/2011 | Ventilla | G06Q 10/10 |
| | | | | 709/206 |
| 2011/0196859 | A1 | 8/2011 | Mei et al. | |
| 2011/0202557 | A1 * | 8/2011 | Atsmon et al. | 707/769 |
| 2011/0313933 | A1 * | 12/2011 | Dai et al. | 705/301 |
| 2011/0314032 | A1 | 12/2011 | Bennett et al. | |
| 2012/0096089 | A1 * | 4/2012 | Barash | G06F 19/3425 |
| | | | | 709/204 |
| 2012/0258776 | A1 | 10/2012 | Lord et al. | |
| 2013/0066693 | A1 * | 3/2013 | Laird-McConnell et al. | 705/14.11 |

(Continued)

OTHER PUBLICATIONS

Van Kleek, et al., "Twiage: A Game for Finding Good Advice on Twitter", CHI 2012, May 5-10, 2012, pp. 889-898.

(Continued)

*Primary Examiner* — Jean M Corrielus
(74) *Attorney, Agent, or Firm* — Alin Corie; Sandy Swain; Micky Minhas

(57) ABSTRACT

Technologies pertaining to generating crowd-sourced answers are described herein. A text string is received, and the text string is parsed to determine if the text string represents an information need that is desirably answered by a collective of crowd workers. When it is determined that the information need is desirably answered by the collective of crowd workers, a query or question that represents the information need is provided to a first plurality of crowd workers, who generate proposed answers for the information need. The proposed answers are provided to a second plurality of crowd workers, who vote on the proposed answers. An answer to the information need is output based upon responses of the crowd workers.

20 Claims, 14 Drawing Sheets

(56) References Cited

U.S. PATENT DOCUMENTS

| | | | |
|---|---|---|---|
| 2013/0132308 A1* | 5/2013 | Boss et al. | 706/12 |
| 2013/0326021 A1* | 12/2013 | Ponnavaikko | G06Q 10/06 709/218 |
| 2014/0019435 A1* | 1/2014 | Ceri | G06F 17/30864 707/712 |
| 2014/0058986 A1* | 2/2014 | Boss | G06F 17/30976 706/12 |
| 2014/0358905 A1* | 12/2014 | Stevens | G06F 17/30991 707/723 |

OTHER PUBLICATIONS

Vallet, David., "Crowdsourced Evaluation of Personalization and Diversification Techniques in Web Search", Retrieved at <<http://ir.ii.uam.es/pubs/crowd-sigir11.pdf>>, SIGIR 2011 Workshop on Crowdsourcing for Information Retrieval, Jul. 28, 2011, pp. 1-6.

Vuurens, et al., "Obtaining High-Quality Relevance Judgments Using Crowdsourcing", Retrieved at <<http://ieeexplore.ieee.org/stamp/stamp.jsp?tp=&arnumber=6216343>>, Internet Computing, Jun. 12, 2012, pp. 1-8.

Lease, et al., "Crowdsourcing for Information Retrieval", Retrieved at <<http://www.sigir.org/forum/2011D/workshops/2011d_sigirforum_lease.pdf>>, ACM SIGIR Forum, Dec. 2, 2011, pp. 1-10.

Eickhoff, et al., "How Crowdsourcable is Your Task?", Retrieved at <<http://prb.tudelft.nl/sites/default/files/csdm2011.pdf>>, Crowdsourcing for Search and Data Mining, Feb. 9, 2011, pp. 1-4.

Adamic, et al., "Everyone Knows Something: Examining Knowledge Sharing on Yahoo Answers", Retrieved at <<http://wwwconference.org/www2008/papers/pdf/p665-adamic.pdf>>, In Proceedings of the 17th International Conference on World Wide Web, Apr. 21, 2008, pp. 1-10.

Aiello, et al., "People Are Strange When You're a Stranger: Impact and Influence of Bots on Social Networks", Retrieved at <<http://www.di.unito.it/~schifane/papers/icwsm12.pdf>>, In Proceedings of the Sixth International AAAI Conference on Weblogs and Social Media, Jun. 4, 2012, pp. 1-8.

Bernstein, et al., "Direct Answers for Search Queries in the Long Tail", Retrieved at <<http://people.csail.mit.edu/msbernst/papers/tailanswers-chi2012.pdf>>, In Proceedings of the SIGCHI Conference on Human Factors in Computing Systems, May 5, 2012, pp. 1-10.

Bigham, et al., "VizWiz: Nearly Real-Time Answers to Visual Questions", Retrieved at <<http://citeseerx.ist.psu.edu/viewdoc/download;jsessionid=CD5E360128D2DA2706580D83F753BAD0-doi=10.1.1.222.9697&rep=rep1&type=pdf>>, In Proceedings of the 23rd Annual ACM Symposium on User Interface Software and Technology, Oct. 3, 2010, pp. 1-10.

"Introducing the New Bing: Spend Less Time Searching, More Time Doing", Retrieved at <<http://www.bing.com/community/site_blogs/b/search/archive/2012/05/10/spend-less-time-searching-more-time-doing-introducing-the-new-bing.aspx>>, May 10, 2012, pp. 1-4.

Bozzon, et al., "Answering Search Queries with CrowdSearcher", Retrieved at <<http://www2012.org/proceedings/proceedings/p1009.pdf>>, In Proceedings of the 21st International Conference on World Wide Web, Apr. 16, 2012, pp. 1-10.

Burton, et al., "Crowdsourcing Subjective Fashion Advice using VizWiz: Challenges and Opportunities", Retrieved at <<http://hci.cs.rochester.edu/pubs/pdfs/vizwiz-fashion.pdf>>, In Proceedings of the 14th International ACM SIGACCESS Conference on Computers and Accessibility, Oct. 22, 2012, pp. 1-8.

Efron, et al., "Questions are Content: A Taxonomy of Questions in a Microblogging Environment", Retrieved at<<https://asis.org/asist2010/proceedings/proceedings/ASIST_AM10/submissions/208_Final_Submission.pdf>>, In Proceedings of the 73rd ASIS&T Annual Meeting on Navigating Streams in an Information Ecosystem, Oct. 22, 2010, pp. 1-10.

Franklin, et al., "CrowdDB: Answering Queries with Crowdsourcing", Retrieved at <<http://www.cs.berkeley.edu/~rxin/papers/crowddb_sigmod2011.pdf>>, In Proceedings of the ACM SIGMOD International Conference on Management of Data, Jun. 12, 2011, pp. 1-12.

Ghosh, et al., "Cognos: Crowdsourcing Search for Topic Experts in Microblogs", Retrieved at <<http://www.mpi-soft.mpg.de/~gummadi/papers/twitter_wtf.pdf>>, In Proceedings of the 35th International ACM SIGIR Conference on Research and Development in Information Retrieval, Aug. 12, 2012, pp. 1-10.

Hecht, et al., "Tweets from Justin Bieber's Heart: The Dynamics of the "Location" Field in User Profiles", Retrieved at <<http://brenthecht.com/papers/bhecht_chi2011_location.pdf>>, In Proceedings of the SIGCHI Conference on Human Factors in Computing Systems, May 7, 2011, pp. 1-10.

Hecht, et al., "SearchBuddies: Bringing Search Engines into the Conversation", Retrieved at <<http://www.aaai.org/ocs/index.php/ICWSM/ICWSM12/paper/download/4667/4976>>, In Proceedings of the Sixth International AAAI Conference on Weblogs and Social Media, Jun. 4, 2012, pp. 1-8.

Horowitz, et al., "The Anatomy of a Large-Scale Social Search Engine", Retrieved at <<http://www.ra.ethz.ch/CDstore/www2010/www/p431.pdf>>, In Proceedings of the 19th International Conference on World Wide Web, Apr. 26, 2010, pp. 1-10.

Java, et al., "Why We Twitter: Understanding Microblogging Usage and Communities", Retrieved at <<http://aisl.umbc.edu/resources/369.pdf>>, In Proceedings of the 9th WebKDD and 1st SNA-KDD Workshop on Web Mining and Social Network Analysis, Aug. 12, 2007, pp. 1-10.

Lampe, et al., "Perceptions of Facebook's Value as an Information Source", Retrieved at <<http://stiet.cms.si.umich.edu/sites/stiet.cms.si.umich.edu/files/Perceptions%20of%20Facebook%E2%80%99s%20Value%20as%20an%20Information%20Source.pdf>>, In Proceedings of the SIGCHI Conference on Human Factors in Computing Systems, May 5, 2012, pp. 1-10.

Li, et al., "Question Identification on Twitter", Retrieved at <<http://www.cse.cuhk.edu.hk/lyu/_media/paper/cikm_qweet.pdf>>, In Proceedings of the 20th ACM International Conference on Information and Knowledge Management, Oct. 24, 2011, pp. 1-4.

Liu, et al., "Predicting Web Searcher Satisfaction with Existing Community-Based Answers", Retrieved at <<http://www.cs.cmu.edu/~dpelleg/download/sigir311-liu.pdf>>, In Proceedings of the 34th International ACM SIGIR Conference on Research and Development in Information Retrieval, Jul. 24, 2011, pp. 1-11.

Morris, et al., "Tweeting is Believing? Understanding Microblog Credibility Perceptions", Retrieved at <<http://research.microsoft.com/pubs/155374/tweet_credibility_cscw2012.pdf>>, In Proceedings of the ACM Conference on Computer Supported Cooperative Work, Feb. 11, 2012, pp. 1-10.

Morris, et al., "What Do People Ask their Social Networks, and Why? A Survey Study of Status Message Q&A Behavior", Retrieved at <<http://research.microsoft.com/pubs/154559/chi10-social.pdf>>, In Proceedings of the SIGCHI Conference on Human Factors in Computing Systems, Apr. 10, 2010, pp. 1-10.

Morris, et al., "A Comparison of Information Seeking Using Search Engines and Social Networks", Retrieved at <<http://www.aaai.org/ocs/index.php/ICWSM/ICWSM10/paper/download/1518/1879>>, In Proceedings of the Fourth International AAAI Conference on Weblogs and Social Media, May 23, 2010, pp. 1-4.

Nichols, et al., "Asking Questions of Targeted Strangers on Social Networks", Retrieved at <<http://www.jeffreynichols.com/papers/twitter-qa-cscw2012.pdf>>, In Proceedings of the ACM Conference on Computer Supported Cooperative Work, Feb. 11, 2012, pp. 1-4.

Panovich, et al., "Tie Strength in Question & Answer on Social Network Sites", Retrieved at <<http://groups.csail.mit.edu/uid/other-pubs/cscw2012-tiestrength.pdf>>, In Proceedings of the ACM Conference on Computer Supported Cooperative Work, Feb. 11, 2012, pp. 1-10.

Paul, et al., "What is a Question? Crowdsourcing Tweet Categorization", Retrieved at <<http://crowdresearch.org/chi2011-workshop/papers/paul.pdf>>, In Proceedings of ACM CHI Conference on Human Factors in Computing Systems, May 7, 2011, pp. 1-5.

(56) References Cited

OTHER PUBLICATIONS

Paul, et al., "Is Twitter a Good Place for Asking Questions? A Characterization Study", Retrieved at <<http://www.personal.psu.edu/sap246/spaul_ICWSM11_poster_Final.pdf>>, In Proceedings of Fifth International AAAI Conference on Weblogs and Social Media, Jul. 17, 2011, pp. 1-4.

Teevan, et al., "Factors Affecting Response Quantity, Quality and Speed for Questions Asked via Social Network Status Messages", Retrieved at <<http://people.csail.mit.edu/kp/icwsm11.pdf>>, In Proceedings of Fifth International AAAI Conference on Weblogs and Social Media, Jul. 17, 2011, pp. 1-4.

Thom, et al., "What Are You Working On? Status Message Q&A in an Enterprise SNS", Retrieved at <<http://www.ecscw.org/2011/20-%20Thom%20et%20AI%20313-332.pdf>>, In Proceedings of the 12th European Conference on Computer Supported Cooperative Work, Sep. 24, 2011, pp. 1-20.

White, et al., "Effects of Community Size and Contact Rate in Synchronous Social Q&A", Retrieved at <<http://research.microsoft.com/pubs/157627/imx_chi2011.pdf>>, In Proceedings of CHI Conference on Human Factors in Computing Systems, May 7, 2011, pp. 1-10.

Yang, et al., "Culture Matters: A Survey Study of Social Q&A Behavior", Retrieved at <<http://www-personal.umich.edu/~ladamic/papers/socialQnA/CultureSocialQnA.pdf>>, In Proceedings of Fifth International AAAI Conference on Weblogs and Social Media, Jul. 17, 2011, pp. 1-8.

Adar, et al., "The Web Changes Everything: Understanding the Dynamics of Web Content", Retrieved at <<http://people.csail.mit.edu/teevan/work/publications/papers/wsdm09-change.pdf>>, In Proceedings of the Second ACM International Conference on Web Search and Data Mining, Feb. 9, 2009, pp. 1-10.

Agichtein, et al., "Learning to Find Answers to Questions on the Web", Retrieved at <<http://web1.cs.columbia.edu/~gravano/Papers/2004/toit04.pdf>>, In Journal of ACM Transactions on Internet Technology, vol. 4, Issue 2, May 2004, pp. 1-34.

Banko, et al., "Open Information Extraction from the Web", Retrieved at <<http://ijcai.org/papers07/Papers/IJCAI07-429.pdf<>, In Proceedings of the 20th International Joint Conference on Artificial Intelligence, Jan. 6, 2007, pp. 1-7.

Bernstein, et al., "Soylent: A Word Processor with a Crowd Inside", Retrieved at <<http://groups.csail.mit.edu/uid/other-pubs/soylent.pdf>>, In Proceedings of the 23nd Annual ACM Symposium on User Interface Software and Technology, Oct. 3, 2010, pp. 1-10.

Brill, et al., "An Analysis of the AskMSR Question-Answering System", Retrieved at <<http://acl.ldc.upenn.edu/W/W02/W02-1033.pdf>>, In Proceedings of the Conference on Empirical Methods in Natural Language Processing, vol. 10, Jul. 2002, pp. 1-8.

Broder, Andrei., "A Taxonomy of Web Search", Retrieved at <<http://silverfish.iiitb.ac.in/ver0/nutch_crawled_pdfs/indexed/p3-broder.pdf>>, In ACM SIGIR Forum, vol. 36, Issue 2, Sep. 2002, pp. 1-8.

Chilton, et al., "Addressing People's Information Needs Directly in a Web Search Result Page", Retrieved at <<http://wwwconference.org/www2011/proceeding/proceedings/p27.pdf>>, In Proceedings of the 20th International Conference on World Wide Web, Mar. 28, 2011, pp. 1-10.

Cutrell, et al., "What Are You Looking For? An Eye-Tracking Study of Information Usage in Web Search", Retrieved at <<http://nguyendangbinh.org/Proceedings/CHI/2007/docs/p407.pdf>>, In Proceedings of the SIGCHI Conference on Human Factors in Computing Systems, Apr. 28, 2007, pp. 1-10.

Horowitz, et al., "The Anatomy of a Large-Scale Social Search Engine", Retrieved at <<http://kamvar.org/assets/papers/aardvark.pdf>>, In Proceedings of the 19th International Conference on World Wide Web, Apr. 26, 2010, pp. 1-10.

Law, et al., "Towards Large-Scale Collaborative Planning: Answering High-Level Search Queries Using Human Computation", Retrieved at <<http://www.cs.cmu.edu/~elaw/papers/crowdplan.pdf>>, In Proceedings of the Twenty-Fifth AAAI Conference on Artificial Intelligence, Aug. 7, 2011, pp. 1-6.

Le, et al., "Ensuring Quality in Crowdsourced Search Relevance Evaluation: The Effects of Training Question Distribution", Retrieved at <<http://ir.ischool.utexas.edu/cse2010/materials/leetal.pdf>>, In Proceedings of the SIGIR 2010 Workshop on Crowdsourcing for Search Evaluation, Jul. 23, 2010, pp. 1-4.

Li, et al., "Good Abandonment in Mobile and PC Internet Search", Retrieved at <<http://static.googleusercontent.com/external_content/untrusted_dlcp/research.google.com/en//pubs/archive/35486.pdf>>, In Proceedings of the 32nd International ACM SIGIR Conference on Research and Development in Information Retrieval, Jul. 19, 2009, pp. 1-8.

Lin, Jimmy., "An Exploration of the Principles Underlying Redundancy-Based Factoid Question Answering", Retrieved at <<http://www.umiacs.umd.edu/~jimmylin/publications/Lin_TOIS2007.pdf>>, In Journal of ACM Transactions on Information Systems, vol. 25, Issue 2, Article No. 6, Apr. 2007, pp. 1-55.

Little, et al., "Exploring Iterative and Parallel Human Computation Processes", Retrieved at <<http://groups.csail.mit.edu/uid/projects/turkit/hcomp2010-turkit.pdf>>, In Proceedings of the ACM SIGKDD Workshop on Human Computation, Jul. 25, 2010, pp. 1-9.

Stamou, et al., "Queries without Clicks: Successful or Failed Searches?", Retrieved at <<http://www.dblab.upatras.gr/download/nlp/NLP-Group-Pubs/09-SIGIR_Queries_without_Clicks.pdf>>, In Proceedings of the SIGIR Workshop on the Future of IR Evaluation, Jul. 2009, pp. 1-2.

Suchanek, et al., "YAGO: A Core of Semantic Knowledge Unifying WordNet and Wikipedia", Retrieved at <<http://wwwconference.org/www2007/papers/paper391.pdf>>, In Proceedings of the 16th International Conference on World Wide Web, May 8, 2007, pp. 1-10.

Teevan, et al., "Understanding and Predicting Personal Navigation", Retrieved at <<http://people.csail.mit.edu/teevan/work/publications/papers/wsdm11-pnav.pdf>>, In Proceedings of the Fourth ACM International Conference on Web Search and Data Mining, Feb. 9, 2011, pp. 1-10.

White, et al., "Studying the Use of Popular Destinations to Enhance Web Search Interaction", Retrieved at <<http://silverfish.iiitb.ac.in/ver0/nutch_crawled_pdfs/indexed/WhiteSIGIR2007a.pdf>>, In Proceedings of the 30th Annual International ACM SIGIR Conference on Research and Development in Information Retrieval, Jul. 23, 2007, pp. 1-8.

\* cited by examiner

PROVIDING CROWDSOURCED ANSWERS TO INFORMATION NEEDS PRESENTED BY SEARCH ENGINE AND SOCIAL NETWORKING APPLICATION USERS

BACKGROUND

Search engines are continuously being adapted to provide relevant information to users responsive to receipt of a query. For example, a search engine results page (SERP) displayed by a conventional search engine to an issuer of a query includes more information than a list of web page titles and snippets retrieved therefrom. For popular topics, such as, weather, movies, and definitions, some search engines have added custom interfaces with direct results; for instance, a search engine can provide the answer of "77 degrees, partly cloudy" to a user who issues the query "weather in Los Angeles," wherein such answer is displayed inline with web page titles and corresponding snippets. These types of answers that can be provided to users of a search engine are known as direct answers, and allow searchers to satisfy an information need without having to click through to a web page. Direct answers have a measurable impact on user behavior with respect to SERPs, and oftentimes a user will repeatedly seek direct answers of certain types once such user realizes that the search engine can provide the direct answers.

Further, some people have turned to social networking applications to obtain answers to respective information needs. A user of a social networking application can submit a question to a public or private feed in hopes that someone (e.g., a contact of the user) will provide an answer to the question. Oftentimes, however, the issuer of the question receives little or no feedback, causing the information need of the user to remain unsatisfied.

SUMMARY

The following is a brief summary of subject matter that is described in greater detail herein. This summary is not intended to be limiting as to the scope of the claims.

Described herein are various technologies pertaining to employing a collective of crowd workers to provide answers to information needs of users of a search engine and/or social networking application. With respect to a search engine, an exemplary manner in which crowds can be used is to identify portions of Web pages which are likely to include answers to information needs (or to directly provide answers to queries set forth by users of the search engine). For instance, search logs of the search engine can be analyzed to identify certain web pages (referred to as candidate web pages) that are believed to include information that satisfies information needs of several users of the search engine. In an exemplary embodiment, candidate web pages can be identified by analyzing end user behavior with respect to queries submitted by users, URLs presented to such users, and user interaction with the URLs. For instance, a web page selected from SERPs that is often a destination web page (users do not return to respective SERPs and select other search results) can be labeled as a candidate web page.

The candidate web page and queries issued by users that selected the candidate web page can be transmitted to a first plurality of computing devices respectively operated by a first plurality of crowd workers in a collective of crowd workers. For instance, the crowd workers in the collective of crowd workers can be paid workers that are provided certain monies responsive to completing a specified task. The first plurality of crowd workers can also be provided with first instructions for completing a task, wherein the task is to review content of the candidate web page and extract (e.g., select, highlight, . . . ) a portion therein that a respective crowd worker believes best answers the information need represented by the candidate web page and associated queries. Thus, each crowd worker in the first plurality of crowd workers extracts a respective portion of the candidate web page believed to best answer the information need, and submits such portion. Portions selected by crowd workers in the first plurality of crowd workers are transmitted to a second plurality of computing devices operated by a respective second plurality of workers, wherein crowd workers in the second plurality of crowd workers vote on which portion is believed to be the best portion for answering the information need. Optionally, the second plurality of crowd workers can receive other options that may answer the information need, such as algorithmically generated answers, such that the second plurality of crowd workers has the option to select an option transmitted by the first plurality of crowd workers or some other option.

The portion of the candidate web page receiving the most votes from crowd workers in the second plurality of crowd workers is selected as being a candidate answer, and the candidate answer is optionally transmitted to a third plurality of computing devices operated by a respective third plurality of crowd workers. Instructions are also transmitted to the third plurality of computing devices, where the instructions instruct each crowd worker in the third plurality of crowd workers to proofread and/or edit the candidate answer to improve readability. Accordingly, each crowd worker in the third plurality of crowd workers may submit a proposed final answer (subsequent to proofreading/editing the candidate answer), and the proposed final answers are submitted by the third plurality of crowd workers.

Thereafter, the proposed final answers are transmitted to a fourth plurality of computing devices operated by a respective fourth plurality of crowd workers. Each crowd worker in the fourth plurality of crowd workers is instructed to identify which proposed final answer best answers the information need represented by the candidate web page and corresponding queries. The proposed final answer receiving the most votes as being the best at answering the information need is selected as the final answer for the information need. This semi-automated pipeline ensures that the final answer for the information need is of high quality and readily consumable by end users of the search engine. After the final answer has been generated, for example, when a user issues a query that causes the search engine to present the candidate web page relatively highly in a SERP, or when a user issues a query that is equivalent to or clustered with queries previously found to be associated with the candidate web page, the final answer can be presented to the user inline with conventional search results.

In another exemplary embodiment, the search engine can be adapted to provide an answer to an information need using a collective of crowd workers in real-time or near real-time. In such an embodiment, when a user issues a query to the search engine, the query can be analyzed to ascertain if it represents an information need that is desirably answered by a collective of crowd workers. For instance, the issuer of the query may manually indicate that it is desirable that the collective of crowd workers provide an answer to the query. In another example, the query can be analyzed to understand semantic meaning thereof, and the query can be automatically identified as representing an information need that is desirably answered by the collective of crowd workers. In yet another example, features of the query can be analyzed, and it can be ascertained that the query represents an information need that is time-critical in nature (e.g., "put out a grease fire"). If it is determined that the query is desirably answered by the collective of crowd workers, the query (and optionally other information pertaining to context of the query) is transmitted to a first plurality of computing devices operated by a respective first plurality of crowd workers in the collective of crowd workers with first instructions, wherein the first instructions instruct that each crowd worker in the first plurality of crowd workers provide a proposed answer to the query. Each crowd worker in the first plurality of crowd workers may then submit a respective proposed answer to the query. Each of these proposed answers is transmitted to a second plurality of computing devices operated by a respective second plurality crowd workers in the collective of crowd workers together with second instructions that instruct crowd workers in the second plurality of crowd workers to indicate which proposed answer is the best answer to the information need represented by the query. Each crowd worker in the second plurality of crowd workers then votes on which of the proposed answers best answers the information need. The proposed answer receiving the most votes from crowd workers in the second plurality of crowd workers may then be provided as a final answer to the user as a portion of a SERP and/or as an alternative to a SERP. As the final answer will be delayed relative to conventional search results provided to the issuer of the query, the search results page can be updated when the final answer is received, or the final answer can be transmitted to the issuer of the query through some other communications medium (e.g., email, instant message, social network message, text message, . . . ).

With respect to a social networking application, it has been observed that users of such applications often submit questions by way of a public page or a public feed. Such publicly available information can be analyzed to recognize questions that represent information needs desirably answered by a collective of crowd workers. An exemplary question that represents an information need that is desirably answered using crowd workers can be a question that requests a subjective opinion or a particular fact. Pursuant to an example, a message (sometimes referred to as an update, a post, or the like) set forth by a user of the social networking application can be analyzed to identify if such message includes a question that is desirably answered by the collective of crowd workers. For instance, features of the message can be analyzed to ascertain if punctuation is in accordance with a question, if the message includes certain words known to be question words (e.g., "how", "where", "what", . . . ), if hash tags are included in the message, etc., and the message can be identified as including a question that is desirably answered by the collective of crowd workers based at least in part upon such features. Responsive to determining that the message includes a question that is desirably answered by the collective of crowd workers, the question can be transmitted to a first plurality of computing devices operated by a first plurality of crowd workers in the collective of crowd workers. Additional information may also be provided to the first plurality of crowd workers, including, but not limited to, candidate web pages that may include an answer to the question, other answers to the question submitted by users of the social networking application, etc.

Each crowd worker in the first plurality of crowd workers is instructed to generate a respective proposed answer to the question in the message. The proposed answers can be transmitted to a second plurality of computing devices operated by a respective second plurality of crowd workers in the collective of crowd workers, and each crowd worker in the second plurality of crowd workers votes on which of the proposed answers is the best answer. The proposed answer voted as being the best answer can be submitted to the poster of the message as a final answer (e.g., as a private message, posted to the public feed, . . . ).

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
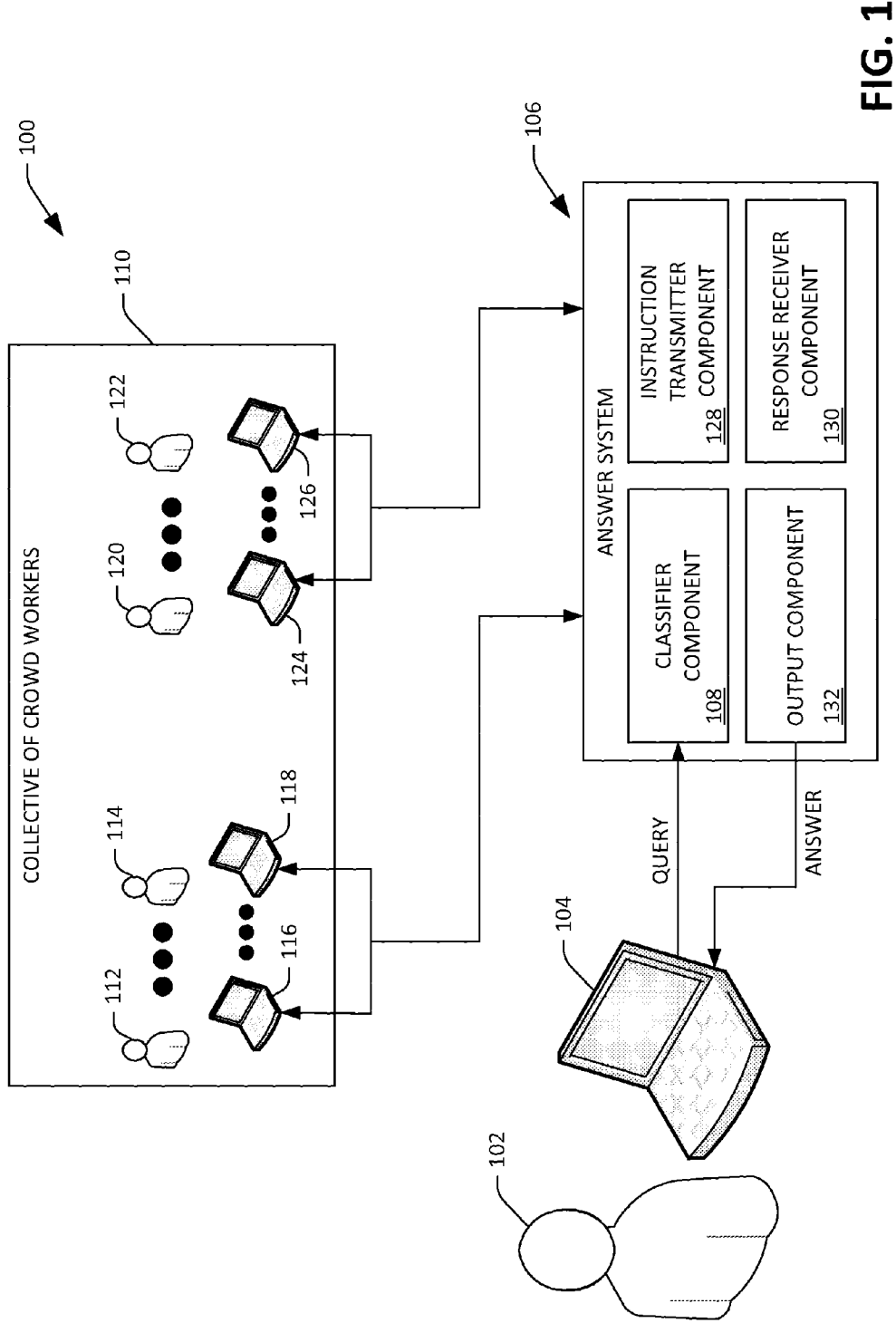
FIG. 1 is a functional block diagram of an exemplary system that facilitates presenting, to a user of a search engine or social networking application, a crowd-sourced answer to an information need of the user.

Various technologies pertaining to providing crowd-sourced answers to information needs of users will now be described with reference to the drawings, where like reference numerals represent like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, the term "exemplary" is intended to mean serving as an illustration or example of something, and is not intended to indicate a preference.

With reference now to FIG. 1, an exemplary system 100 that facilitates provision of crowd-sourced answers to users of at least one of a search engine or social media application responsive to such users expressing information needs that are desirably answered by a collective of crowd workers is illustrated. A user 102 operates a computing device 104 to access at least one of a search engine or social networking application. The computing device 104 can be any suitable computing device, including a desktop computer, a laptop computer, a mobile telephone, a tablet computing device, a portable media player, etc. In a non-limiting example, the user 102 can operate the computing device 104 to cause a web browser to be initiated and can direct the web browser to a URL corresponding to the at least one of the search engine or the social networking application. In other embodiments, the computing device 104 may have standalone applications installed thereon for the at least one of the search engine or the social networking application.

The user 102 operates the computing device 104 to express an information need to the search engine or the social networking application. Generally, with respect to the search engine, the information need is expressed in the form of a query submitted by the user 102. With respect to the social networking application, the information need can be expressed in the form of a question included in a message posted on a public page or feed by the user 102.

The system 100 includes an answer system 106 that is employed to provide a crowd-sourced answer to the information need expressed by the user 102 operating the computing device 104. In an example, the answer system 106 may be included in a search engine. In another example, the answer system 106 can monitor messages posted by users of the social networking application. In yet another example, the answer system 106 can be included in the social networking application.

The answer system 106 includes a classifier component 108 that receives the expression of the information need (the query or message), and determines if the information need is one that is desirably answered by a collective of crowd workers 110. The classifier component 108 can utilize various techniques when determining if the information need is desirably answered by the collective of crowd workers 110 (rather than an information need that is not desirably answered by the collective of crowd workers 110). For instance, the user 102 of the computing device 104 can indicate, when setting forth the query or message, that the information need represented thereby is desirably answered by the collective of crowd workers 110. The classifier component 108 can receive such indication and can classify the information need accordingly.

In another example, the classifier component 108 can parse the text of the query or message to ascertain semantic meaning of the query or question, and determine if the corresponding information need is desirably answered by the collective of crowd workers 110. For instance, the classifier component 108 can ascertain that a question submitted by the user 102 is rhetorical in nature, in which it would be undesirable for the collective of crowd workers 110 to provide an answer to the information need represented by such question.

In yet another example, the classifier component 108 can analyze features corresponding to the query or message. Exemplary features include whether the query or message includes a question mark, whether the query or message includes at least one word from a predefined list of words (such as "who," "what," "when," "where," "why," "how," and "which"), whether the query or message includes a certain non-alphanumerical character, such as the "#" symbol, amongst others. For example, users of a relatively popular social networking application employ hash tags to label messages. The classifier component 108 can classify the information need represented by the message as being one that is desirably answered by the collective of crowd workers 110 based at least in part the message including a hash tag.

In still yet another example, the classifier component 108 can be configured to transmit the query or message to a crowd worker in the collective of crowd workers 110, and the crowd worker can indicate whether or not the information need represented by the query or message is desirably answered by the collective of crowd workers 110. The classifier component 108 can determine whether such information need is desirably answered by the collective of crowd workers 110 based at least in part upon such indication.

Still further, the classifier component 108 can be configured to perform a semantic analysis on the text string to ascertain a subject/topic of the information need. For instance, topics can be identified a priori, and the classifier component 108 can be configured to perform the semantic analysis on the text string to classify the text string as belonging to a particular topic, a set of topics, or no defined topic.

The collective of crowd workers 110 comprises a first plurality of crowd workers 112-114 that operate a respective first plurality of computing devices 116-118. The collective of crowd workers 110 further includes a second plurality of crowd workers 120-122 that operate a respective second plurality of computing devices 124-126. In an example, a number of crowd workers in the first plurality of crowd workers 112-114 can be between three and five workers. Additionally, a number of crowd workers in the second plurality of crowd workers 120-122 can be between three and five workers. Crowd workers in the collective of crowd workers 110 can be geographically dispersed, and may or may not be paid crowd workers. For instance, the crowd worker 112 in the first plurality of crowd workers can reside in a first country, while the crowd worker 114 in the first plurality of crowd workers can reside in a second country. Further, the collective of crowd workers 110 can be provided by a paid service. In other examples, the collective of crowd workers 110 can be composed of volunteers, contacts of the user 102, etc.

The answer system 106 is employed in connection with generating an answer to the information need expressed by the user 102 operating the computing device 104 through utilization of the collective of crowd workers 110. The answer system 106 includes an instruction transmitter component 128 that, responsive to the classifier component 108 determining that the information need of the user 108 is desirably answered by the collective of crowd workers 110, transmits the expression of the information need (the query or message), first instructions, and optionally other information to the first plurality of computing devices 116-118 operated by the respective first plurality of crowd workers 112-114. The first instructions instruct each crowd worker in the first plurality of crowd workers 112-114 to perform a same task. In an exemplary embodiment, the task provided to the first plurality of crowd workers 112-114 can be to generate a proposed answer to the information need of the user 102, as expressed in the query or message. In an exemplary embodiment, the instruction transmitter component 128 can identify the first plurality of crowd workers 112-114 from amongst a larger set of crowd workers based upon identified "expertise" of such crowd workers and a topic of the information need identified by the classifier component 108. Thus, if the classifier component 108 has identified the information need as belonging to a certain topic (e.g., medicine related), then the instruction transmitter component 128 can identify the first plurality of crowd workers 112-114 as having some expertise in such topic.

The first plurality of crowd workers 112-114 operate the respective first plurality of computing devices 116-118 to generate proposed answers to the information need of the user. As noted above, the first plurality of crowd workers 112-114 can be provided with supplemental information that can assist them in generating proposed answers to the information need. Such supplemental information can include a resource that may be of assistance to crowd workers in answering the information need. An exemplary resource may include, but is not limited to including, at least one candidate web page that is believed to include an answer to the information need of the user 102, messages posted in response to the message set forth by the user 102, algorithmically generated answers, contextual information about the user 102 (provided with consent of the user 102), etc. Each crowd worker in the first plurality of crowd workers 112-114 employs her computing device in the first plurality of computing devices 116-118 to submit a respective proposed answer to the answer system 106.

The answer system comprises a response receiver component 130 that receives a response to the task (a proposed answer) from each computing device in the first plurality of computing devices 116-118. Responsive to the response receiver component 130 receiving the proposed answers to the information need from the first plurality of computing devices 116-118, the instruction transmitter component 128 can transmit the proposed answers and second instructions to the second plurality of computing devices 124-126 operated by the respective second plurality of crowd workers 120-122. Optionally, the instruction transmitter component 128 can transmit proposed answers generated from a source other than the first plurality of crowd workers 112-114, such as algorithmically generated answers. Each crowd worker in the second plurality of crowd workers 120-122 therefore receives each proposed answer submitted by crowd workers in the first plurality of crowd workers 112-114 (and optionally other proposed answers). The second instructions transmitted by the instruction transmitter component 128 instruct crowd workers in the second plurality of crowd workers 120-122 to indicate which proposed answer from amongst the proposed answers best answers the information need of the user 102. Thus, the second plurality of crowd workers 120-122 can employ the respective second plurality of computing devices 124-126 to submit votes to the answer system 106 as to which proposed answer best answers the information need of the user 102.

The response receiver component 130 receives the votes from the second plurality of computing devices 124-126. The answer system 106 further includes an output component 132 that, responsive to the receiver component 130 receiving the votes, tabulates the votes and selects the proposed answer that received the most votes as a final answer to the information need of the user 102. The output component 132 transmits the final answer to the computing device 104 operated by the user 102, such that the final answer can be displayed to the user 102. As will be described in greater detail below, if the answer system 106 is employed in connection with a search engine, the output component 132 can cause the final answer to be displayed inline with conventional web-based search results generated by the search engine. If the answer system 106 is employed in connection with a social networking application, the output component 132 can cause the final answer to be included in a public feed of the social networking application (in correspondence with the message posted by the user 102) and/or posted on a public page.

While the answer system 106 has been described as being employed in connection with a search engine or social networking application, in other embodiments the answer system 106 can be employed in connection with other applications. For instance, the user 102 can request that the answer system 106 analyze instant messages generated by the user 102 by way of an instant messaging application and provide crowd-sourced answers to information needs expressed in such instant messages. Similarly, the user 102 can request that the answer system 106 analyze emails generated by the user 102 by way of an email application and provide crowd-sourced answers to information needs expressed in such instant messages. It is thus to be understood that the user 102 may request that the answer system 106 be employed with respect to any text generated by such user.

Figure 2:
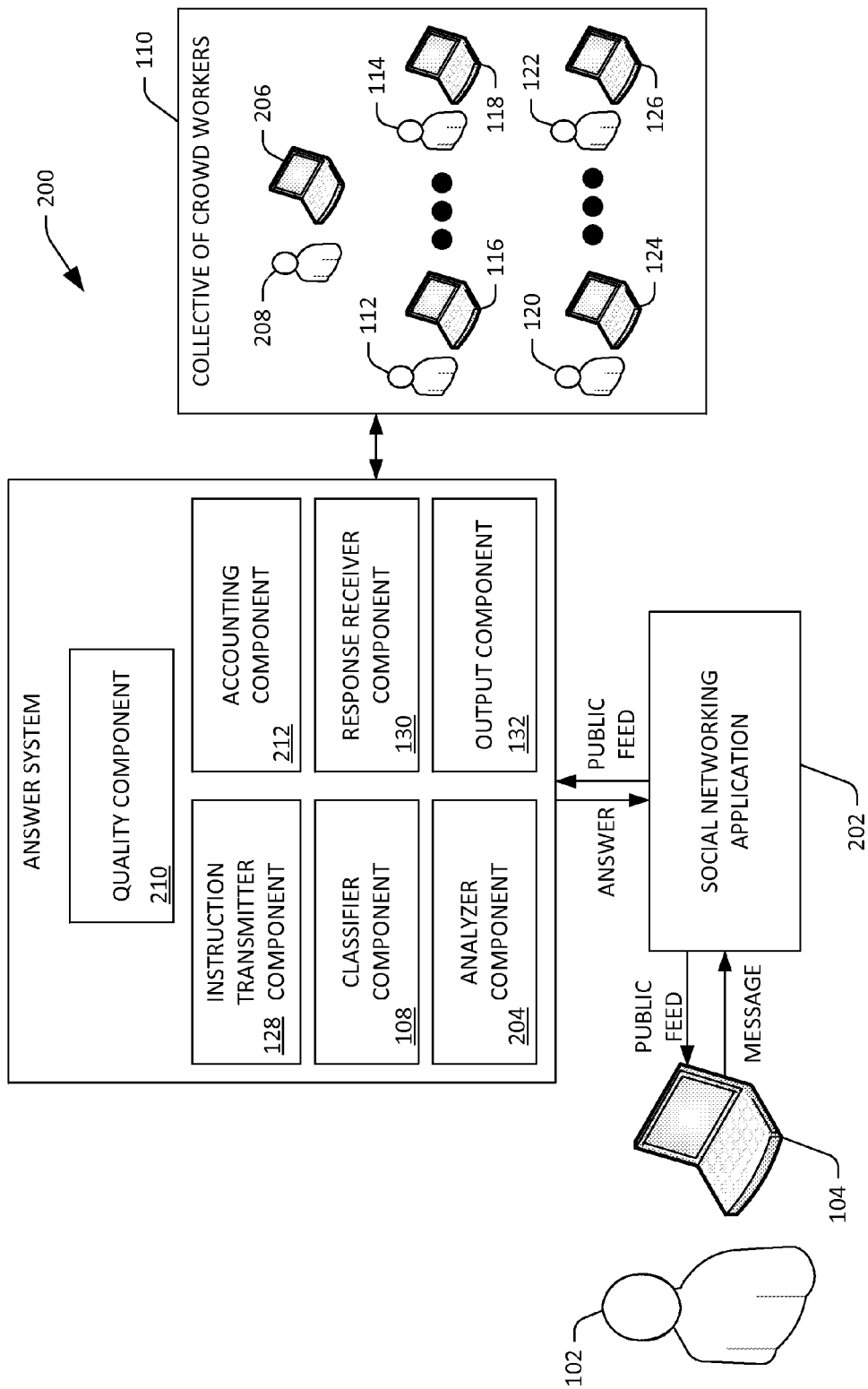
FIG. 2 is a functional block diagram of an exemplary system that facilitates providing a crowd-sourced answer to a question submitted by a user of a social networking application.

Now referring to FIG. 2, an exemplary system 200 that facilitates provision of a crowd-sourced answer to a question included in a message posted by a user of a social networking application is illustrated. In the exemplary system 200, the user 102 operates the computing device 104 to access a social networking application 202. In an exemplary embodiment, the social networking application 202 can be a message broadcasting application, where users of the social networking application 202 can broadcast relatively short messages to a public feed or to other users of the social networking application that subscribe to messages posted by the user 102. A public feed of the social networking application 202 comprises a series of messages posted by users of the social networking application 202 that are available for consumption by the public. Aspects described with respect the system 200, however, are not limited to this type of social networking application. For example, other social networking applications allow users to post messages (status updates) on public pages. Thus, if the individual chooses to post messages on a public page, then other people who are not contacts of the user 102 can review messages posted by the user 102 on such public page.

For purposes of explanation, the social networking application 202 will be described as being a message broadcasting application, although it will be readily apparent that other types of social networking applications are contemplated. As noted above, the user 102 employs the computing device 104 to post a message by way of the social networking application 202 to a public feed. The answer system 106 monitors the public feed for messages that include questions that are desirably answered by the collective of crowd workers 110. While shown as being separate from the social networking application 202, it is to be understood that in some embodiments, the answer system 106 may be included in the social networking application 202. The answer system 106 comprises an analyzer component 204 that monitors the public feed 202 for messages that may include questions. For instance, a message posted by the user 102 may include the question "which is better, peanut butter or jelly?" The analyzer component 204 can parse text of the message and determine that the message includes words typically associated with a question, such as, "who," "what," "when," "where," "why," "how,""which," and/or the like. Further, the analyzer component 204 can look for punctuation, such as a question mark, to determine that the message includes a question.

The classifier component 108 is in communication with the analyzer component 204, and the classifier component 108 can receive an indication from the analyzer component 204 that a message has been posted by the user 102 that includes a question. The classifier component 108 may then further analyze the question to ascertain if it is desirably answered by the collective of crowd workers 110. With more specificity, the classifier component 108 can analyze various features of the message to determine if the question therein is desirably answered by the collective of crowd workers 110. In an example, the classifier component 108 can analyze the question to determine if it is time critical in nature. This can be indicated, for instance, by the question being set forth in all capital letters, by the inclusion of an exclamation point together with a question mark in the question, etc. Moreover, the classifier component 108 can be configured to ignore the question if the message posted by the user 102 is a reposting of a message generated by another user. Likewise, the classifier component 108 can be configured to ignore the question if the message comprising the question includes a URL.

In still yet another example, the classifier component 108 can determine that the question is desirably answered by the collective of crowd workers 110 based at least in part upon a non-alphanumerical character in the message that is positioned in correspondence with the question. For instance, currently, many users of a particular type of social networking application include hash tags in messages (e.g., #help), where a hash tag is used by an author of a message to label such message. Thus, the classifier component 108 can be configured to classify the question as being one which is desirably answered by the collective of crowd workers 110 based upon the inclusion of a hash tag in the message that includes the question. The classifier component 108, as noted above, can also use other automated filtering methods, such as performing a semantic analysis on the question to ascertain if the question is rhetorical in nature, is requesting a subjective opinion, is requesting a fact or listing of facts, etc.

Subsequent to the classifier component 108 utilizing such filtering techniques, if it is determined that the question is one that may desirably be answered by the collective of crowd workers 110, the classifier component 108 can optionally transmit the question to a computing device 206 of a crowd worker 208 in the collective of crowd workers 110, wherein the crowd worker 208 is instructed to make a final determination as to whether the question is desirably answered by the collective of crowd workers 110. For instance, if not undertaken by the classifier component 108, the crowd worker 208 can be asked if the question is a rhetorical question or one that requires subjective input. If the question is rhetorical in nature, the crowd worker 208 can indicate as much, and a crowd-sourced answer is not provided to the user 102. If the crowd worker 208 indicates that the question requires subjective input, is requesting a particular fact or facts, is requesting a list and/or is time critical in nature, the crowd worker 208 can cause the computing device 206 to transmit an indication to the answer system 106 that the question is desirably answered by the collective of crowd workers 110. The classifier component 108 can receive such indication, and responsive to receiving the indication, can classify the question as being desirably answered by the collective of crowd workers 110.

Responsive to the classifier component 108 indicating that the question in the message posted by the user 102 is desirably answered by the collective of crowd workers 110, the instruction transmitter component 128 can transmit the question, first instructions, and (optionally) supplemental information to the first plurality of computing devices 116-118 operated by the respective first plurality of crowd workers 112-114. The first instructions can instruct crowd workers in the first plurality of crowd workers 112-114 to set forth an answer to the question. The supplemental information (also referred to as at least one resource) includes information that may be of assistance to crowd workers in the first plurality of crowd workers 112-114 when formulating respective answers to the question. Such supplemental information may include, but is not limited to including, at least one candidate web page that possibly includes an answer to the question, other questions/ queries related to the question, responses to the message posted by other users of the social networking application 202, algorithmically generated answers, publicly available information about the user 102 (e.g., information in or relating to a user profile for the social networking application 202), information about the user 102 voluntarily provided by the user, etc.

Utilizing the first plurality of computing devices 116-118, crowd workers in the first plurality of crowd workers 112-114 submit respective proposed answers to the question to the answer system 106. The response receiver component 130 receives the proposed answers submitted by the crowd workers in the first plurality of crowd workers 112-114. Responsive to the response receiver component 130 receiving the proposed answers, the instruction transmitter component 128 transmits the proposed answers, the question, second instructions, and (optionally) supplemental information to the second plurality of computing devices 124-126 operated by the respective second plurality of crowd workers 120-122. Additionally, and optionally, the instruction transmitter component 128 can transmit proposed answers generated by sources other than the first plurality of crowd workers 112-114, such as algorithmically generated proposed answers. The second instructions instruct the crowd workers in the second plurality of crowd workers 120-122 to submit an indication (vote) as to which of the proposed answers best answers the question proffered by the user 102. Accordingly, each crowd worker in the second plurality of crowd workers 120-122 receives each proposed answer submitted by crowd workers in the first plurality of crowd workers 112-114 (and optionally proposed answers from other sources) and votes on which of the proposed answers best answers the question set forth by the user 102. Using the second plurality of computing devices 124-126, the respective second plurality of crowd workers 120-122 submits votes to the answer system 106.

The response receiver component 130 receives the votes, and responsive to the response receiver component 130 receiving the votes, the output component 132 tabulates the votes and selects the proposed answer that receives the highest number of votes as being a final answer to the question. If two or more proposed answers have the same number of votes (and that number is the highest number of votes), the output component 132 may randomly select one of such answers or may select both of such answers. The output component 132 may output a message for posting to the public feed, wherein the message includes the final answer. Additionally, the message output by the output component 132 can be positioned in the public feed to indicate that it is a response to the message set forth by the user 102. In other examples, the output component 132 can cause an instant message, text message, e-mail message, or the like, to be transmitted to an account of the user 102.

The answer system 106 further optionally includes a quality component 210 that is configured to ensure that crowd workers in the collective of crowd workers 110 are adequately performing tasks assigned thereto. For example, the quality component 210 can, from time to time, provide a question to crowd workers in the collective of crowd workers, where the question has been labeled with a ground truth. The quality component 210 can create ground truth tasks for which an answer of a worker must meet certain standards (e.g., a proposed answer must include a word or phrase and/or must not include a certain word or phrase). The quality component 210 may then grade individual crowd workers based upon responses to these standardized tasks. If a crowd worker is deemed to perform poorly over time (or very poorly a single time), then the quality component 210 can cause the instruction transmitter component 128 to fail to send further tasks to such crowd worker. The quality component 210 may also utilize user feedback. For instance, if the user 102 indicates that the answer to the question is of poor quality, the quality component 210 can identify which crowd workers in the collective of crowd workers 110 contributed to the answer and grade such crowd workers accordingly. If a grade of a crowd worker over time falls below some threshold, then the instruction transmitter component 128 can be configured to fail to transmit subsequent tasks to such crowd worker.

The answer system 106 may also optionally include an accounting component 212 that monitors tasks completed by crowd workers in the collective of crowd workers 110. For example, as noted above, the crowd workers in the collective of crowd workers 110 may be paid crowd workers, such that they are provided a particular fee for performing a certain task. The accounting component 212 can keep an accounting of tasks performed by individual crowd workers, such that the crowd workers can be appropriately paid.

Figure 3:
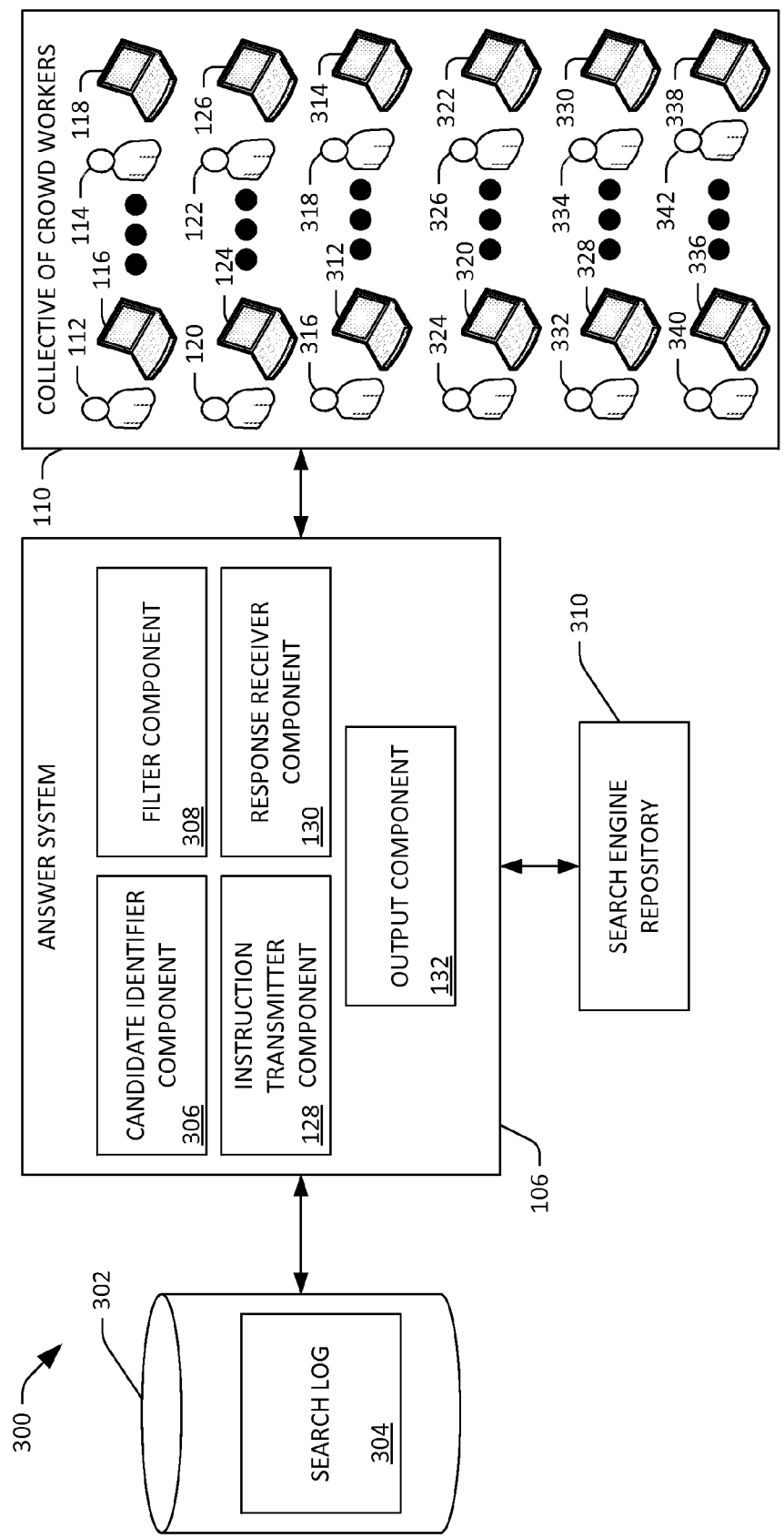
FIG. 3 is a functional block diagram of an exemplary system that facilitates generating crowd-sourced answers to information needs of users identified through analysis of a search log.

Turning now to FIG. 3, an exemplary system 300 that facilitates utilizing the collective of crowd workers 110 to generate answers for information needs of users of a search engine (identified through analysis of search logs) is illustrated. The system 300 includes a data repository 302 that comprises a search log 304. The search log 304 includes a plurality of search sessions of users of the search engine. A search session includes a search query submitted to a search engine and subsequent action undertaken by the issuer of the query (selection of URLs on a SERP, query reformulation, etc.).

The answer system 106 comprises a candidate identifier component 306 that analyzes the search log 304 to identify web pages that are believed to include answers to information needs of users. These web pages are referred to as candidate web pages. In connection with identifying candidate web pages, the candidate identifier component 306 extracts search trails from the search log 304. A search trail is a browsing path beginning with a query submitted by a user and terminating with a session timeout of 30 minutes. The candidate identifier component 306 groups all search trails on a first clicked search result (URL) from a corresponding SERP. Accordingly, the candidate identifier component 306 can identify a set of queries that led to a particular URL and a set of trails that describe what issuers of the queries did subsequent to clicking through to the URL (e.g., return to the SERP and select another URL, reformulate the query, remain on the selected URL, . . . ). Thus, for example, the candidate identifier component 306 can identify URLs that are selected by users some threshold number of times when included on a SERP, wherein when the URLs are selected the respective users terminate their respective search sessions. These identified URLs (candidate web pages) and queries submitted by search engine users when selecting the URLs can be retained, wherein a candidate web page and corresponding queries are referred to as candidate information needs.

A filter component 308 is in communication with the candidate identifier component 306. The filter component 308 identifies information needs identified by the candidate identifier component 306 that are intended for fact finding. Some information needs are too complex to answer, while others have underspecified queries where the information need represented by such queries may be unclear. The filter component 308 can utilize any suitable filtering techniques to identify which candidate information needs are desirably satisfied by answers set forth by the collective of crowd workers 110.

With more specificity, the filter component 308 can use search trails to identify web pages where users quickly end search sessions. For instance, it can be assumed that after submitting query to a search engine and reviewing at least one web page identified in the corresponding SERP, users typically end up at web pages that include information that addresses their respective information needs. If a user ceases browsing after they reach a web page, such page likely includes information that satisfies the information need of the user. If the user reaches a web page and thereafter continues browsing or searching, on the other hand, the web page may not succinctly satisfy the information need of the user. For example, many queries are navigational in nature, in that searchers click on a particular URL in the results, then often keep browsing in the page corresponding to the URL (e.g., by clicking on a link in the page). Other information needs, such as buying a new car, are complex and persist across multiple sessions, so users will often access several pages in a SERP. For many other queries, however, the user will issue a query, click through to a page shown in the SERP, locate the information that is desired, and end the search session.

Accordingly, the filter component 308 can filter candidate web pages (and thus candidate information needs) utilizing a metric that can be referred to as destination probability. The destination probability for a web page is an observed probability that a searcher will end her session at that web page after clicking through to the page from the search results page. For example, a step immediately after the user issuing a query can be a click on web page shown in the SERP. If a high percentage of trails end after such click (e.g., if the trail length is two), the destination probability will be high. If most trails, instead, include actions that return to the SERP or browse to other URLs, the destination probability will be low. In other words, the destination probability for a URL is the observed probability that a click to the URL from the SERP is the last action in the search trail. Candidate web pages with destination probability above a predefined threshold can be identified by the filter component 308 as corresponding to an information need that may be desirably answered by the collective of crowd workers 110. For instance, the filter component 308 can filter out any candidate web pages that have destination probability of less than 0.3.

The filter component 308 can also filter information needs based upon inclusion of words that typically pertain to a question in a query. With more particularity, a destination probability identifies web pages where searchers appear to be finding immediate answers for their information needs. It can be very difficult to infer the fact-finding intent, however, from queries that are only two or three words long. For instance, an answer for the query "dissolvable stitches" would be valuable if the searcher wanted to learn how long the stitches take to dissolve, but would not be valuable if the searcher wanted to learn the history of dissolvable stitches.

To avoid such problem, the filter component 308 can make use of queries that include question-type words. Such words are useful, because they tend to be expressed in natural language, are longer than typical queries, and are more explicit (e.g., "how long do dissolvable stitches last"). Such properties make the information need relatively easy to understand. Use of question words also tends to indicate fact-finding intent. It can be assumed that question-word queries often overlap significantly with unspecified information needs from other queries. For example, different users issuing the queries "where is 732 area code" and "732 area code" may have similar information needs. The filter component 308 can remove candidate web pages that have fewer than some threshold percentage of their clicks (e.g., one percent) from question-word queries. Question words that can be employed by the filter component 308 can include "how," "why," "when," "where," "why," "who," "which," and the like.

The filter component 308 can also be configured to filter candidate web pages based upon answer type. While question words are useful for identifying candidate information needs, neither they, nor other types of behavioral log data, assist in understanding whether a concise answer could address an information need of a user. Having understanding of an expected length of an answer may be important, since the crowd may extract too much text in order to guarantee that the correct information is captured (and, thus, guarantee that the crowd worker will be paid). Answer candidates can be categorized into different types. Short answers are answers that include very little text (less than 100 characters). List answers are those that include a relatively small set of directions. For example, "to change your password, first click a certain hyperlink, then click a button, and thereafter click the 'change password button'". Summary answers are those that synthesize large amounts of content.

Responsive to the filter component 308 identifying a set of candidate information needs, the instruction transmitter component 128 can transmit a candidate information need (which includes a candidate web page and queries corresponding to the candidate web page identified from the search log 304) and first instructions to the first computing devices 116-118 operated by the respective first plurality of crowd workers 112-114. The first instructions can request that each crowd worker in the first plurality of crowd workers 112-114 extract as little text as possible from the candidate web page (using the corresponding queries as a guide), wherein the extracted text is believed by the crowd worker to best answer the candidate information need. Accordingly, each crowd worker in the first plurality of crowd workers 112-114 can employ a respective computing device in the first plurality of computing devices 124-126 to submit a portion the candidate web page believed to best satisfy the candidate information need (represented by the at least one query and the candidate web page).

The response receiver component 130 receives the submitted portions of the candidate web page from crowd workers in the first plurality of crowd workers 112-114. The instruction transmitter component 128, in response to the response receiver component 130 receiving the portions of the candidate web page submitted by crowd workers in the first plurality of crowd workers 112 through 114, can transmit the portions of the candidate web page, the candidate web page, and second instructions to the second plurality of computing devices 124-126 operated by the respective second plurality of crowd workers 120-122. The second instructions instruct each crowd worker in the second plurality of crowd workers 120-122 to vote on which portion of the portions of the candidate web page identified by crowd workers in the first plurality of crowd workers 112-114 best answers the information need. Each crowd worker in the second plurality of crowd workers 120-122 uses a respective computing device in the second plurality of computing devices 124-126 to submit a vote to the answer system 106 as to which portion best answers the information need.

The response receiver component 130 receives the votes submitted by the second plurality of crowd workers 120-122, tabulates the votes, and selects the portion of the candidate web page receiving the highest number of votes. In an exemplary embodiment, the output component 132 can output the portion of the web page receiving the highest number of votes as the best answer to the information need, and such portion can be retained in a search engine repository 310, indexed by, for instance, a web page from which the portion was extracted and/or queries corresponding to the web page. As will be described below, such search engine repository 310 can subsequently be accessed to provide searchers with crowd-sourced answers.

Optionally, responsive to the response receiver component 130 receiving the aforementioned votes, the instruction transmitter component 128 can transmit the portion receiving the most votes, the queries corresponding to such portion, and third instructions to a third plurality of computing devices 312-314 operated by a third plurality of crowd workers 316-318. The third instructions instruct the third plurality of crowd workers 316-318 to propose edits to the portion of the candidate web page, wherein the edits are to summarize such portion, improve readability of such portion, or cause such portion to conform to predefined rules set forth by the search engine (e.g., no longer than fifteen words, include correct punctuation, . . . ). Each crowd worker in the third plurality of crowd workers 316-318 can independently edit the aforementioned portion of the candidate web page, and can use a respective computing device in the third plurality of computing devices 312-314 to submit edited portions to the answer system 106. The response receiver component 130 receives the edited portions, and responsive to the response receiver component receiving the edited portions, the instruction transmitter component 128 can transmit the edited portions, the queries, and fourth instructions to a fourth plurality of computing devices 320-322 operated by a fourth plurality of crowd workers 324-326. The fourth instructions instruct each crowd worker in the fourth plurality of crowd workers 324-326 to submit a respective vote as to which edited portion is the best edited portion. The fourth plurality of crowd workers 324-326 use the respective fourth plurality of computing devices 320-322 to submit the votes to the answer system 106. The response receiver component 130 can receive votes submitted by crowd workers in the fourth plurality of crowd workers 324-326, tabulate the votes, and select the edited portion receiving the highest number of votes as being an answer to the information need.

Responsive to the response receiver component 130 receiving the votes from the fourth plurality of computing devices 320-322, the instruction transmitter component 128 can transmit the answer, the queries, and fifth instructions to a fifth plurality of computing devices 328-330 operated by a fifth plurality of crowd workers 332-334. The fifth instructions can instruct crowd workers in the fifth plurality of crowd workers 332-334 to assign a short title (e.g., five words or less) to the answer system 106. Each crowd worker in the fifth plurality of crowd workers 332-334 uses a respective computing device in the fifth plurality of computing devices 328-330 to submit respective short titles to the answer system 106.

Responsive to the response receiver component 130 receiving proposed short titles from the fifth plurality of computing devices 328-330, the instruction transmitter component 128 can transmit such short titles, the answer, and sixth instructions to a sixth plurality of computing devices 336-338 operated by a respective sixth plurality of crowd workers 340-342. The sixth instructions can instruct each crowd worker in the sixth plurality of crowd workers 340-342 to submit a respective vote as to which short title is the best short title. The sixth plurality of crowd workers 340-342 operate the sixth plurality of computing devices 336-338 to submit votes to the answer system 106.

The response receiver component 130 can receive such votes, tabulate the votes, and select the short title with the greatest number of votes as being a title for the answer. The output component 132 can cause the answer and the short title to be retained in the search engine repository 310. Using this approach, many answers and short titles can be generated by the collective of crowd workers 110 for various information needs of users of the search engine identified in the search log 304.

As mentioned above, the answer system 106 can optionally include the quality component 210 to ensure that crowd workers in the collective of crowd workers 110 are adequately following the instructions. The quality component 210 can incorporate what is referred to as the "gold standard technique", which requires that crowd workers demonstrate competence by agreeing with answers to pre-authored example questions for a task. The quality component 210 can silently insert gold standard questions into a work queue of a crowd worker, and crowd workers who fail to answer a threshold number of gold standard questions correctly can be identified, such that future tasks are not assigned to such crowd workers.

Further, the quality component 210 can incorporate an inclusion/exclusion list for gold standard testing with respect to the first plurality of crowd workers 112-114. To use an inclusion/exclusion list in connection with gold standard testing for the first plurality of crowd workers 112-114, a crowd worker must extract sections of the page included in the inclusion list and must not extract sections of the page included in the exclusion list.

Figure 4:
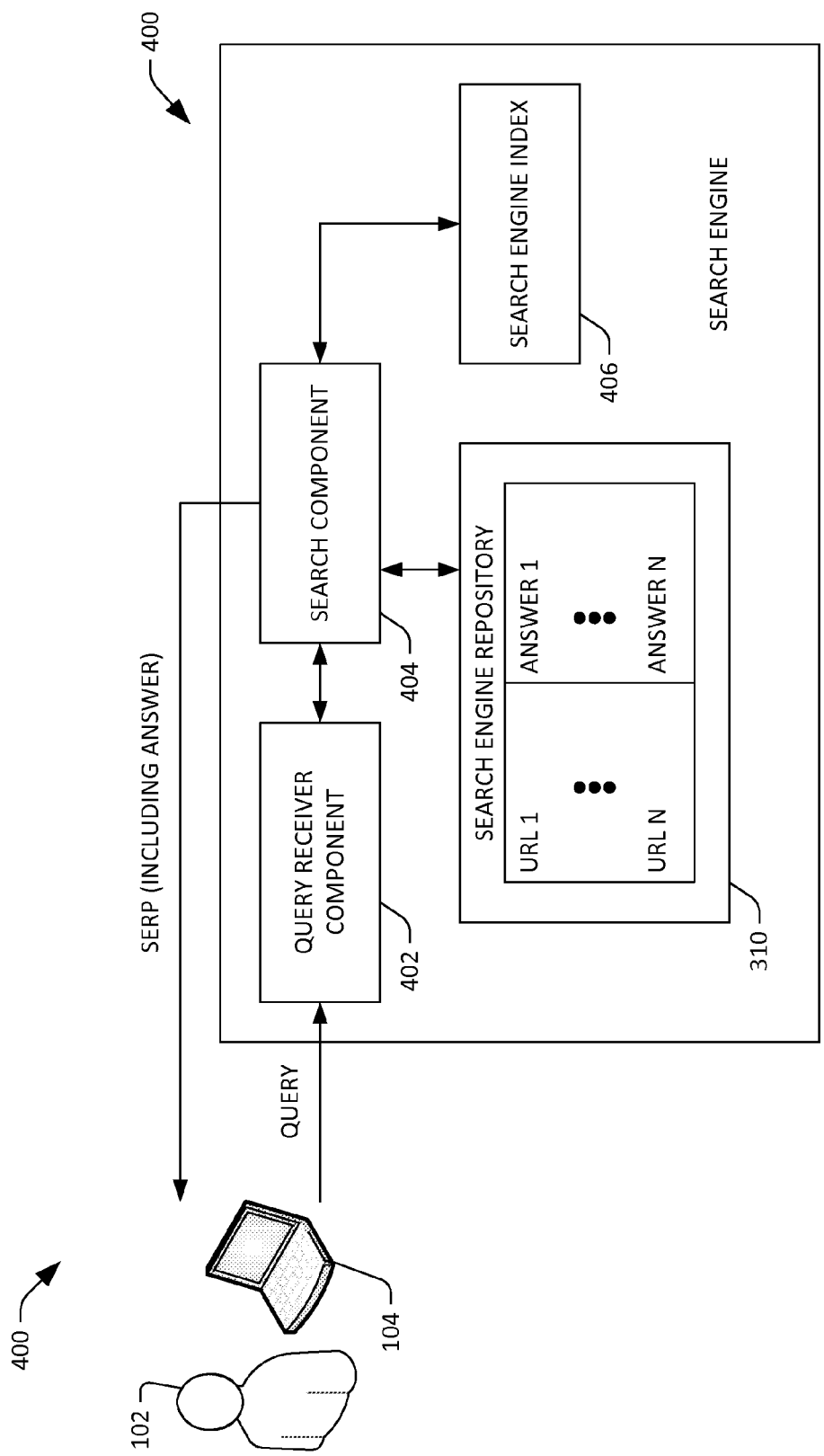
FIG. 4 is a functional block diagram of an exemplary system that facilitates providing to a user of a search engine a crowd-sourced answer to an information need of the user.

Now referring to FIG. 4, an exemplary search engine 400 that includes a previously generated crowd-sourced answer (e.g., generated through utilization of the system 300) in a SERF responsive to the user 102 submitting a query to the search engine 400 by way of the computing device 104 is illustrated. The search engine 400 includes a query receiver component 402 that receives a query submitted by the user 102 of the computing device 104. A search component 404 is in communication with the query receiver component 402, and executes a search over a search engine index 406 based at least in part upon the query. Execution of the search results in retrieval of a ranked list of URLs. The search component 404 can access the search engine repository 310 responsive to retrieving the ranked list of URLs and ascertain if a URL in the search engine repository 310 (which has a crowd-sourced answer based at least in part upon content of a web page corresponding to the URL) is included in some top threshold number of URLs in the ranked list of URLs. If the search results include a URL (e.g., as one of the top three search results) that is identified in the search engine repository, the search component 404 can retrieve the crowd-sourced answer corresponding to such URL and include the answer inline with the search results. Additionally, the answer can be highlighted to indicate that the answer is a crowd-sourced answer.

In a specific example, the search component 404 can receive a query, execute a search over the search engine index 406, and generate a ranked list of search results, wherein a first URL (URL 1) is the second most highly ranked search result in the ranked list of search results. The search component 404 can then access the search engine repository 310, which includes a list of URLs that have crowd-sourced answers corresponding thereto. The search component 404 can determine that the search engine repository 310 includes URL 1, and can extract the corresponding answer (answer 1) from the search engine repository 310 and include answer 1 inline with the ranked list of search results.

Figure 5:
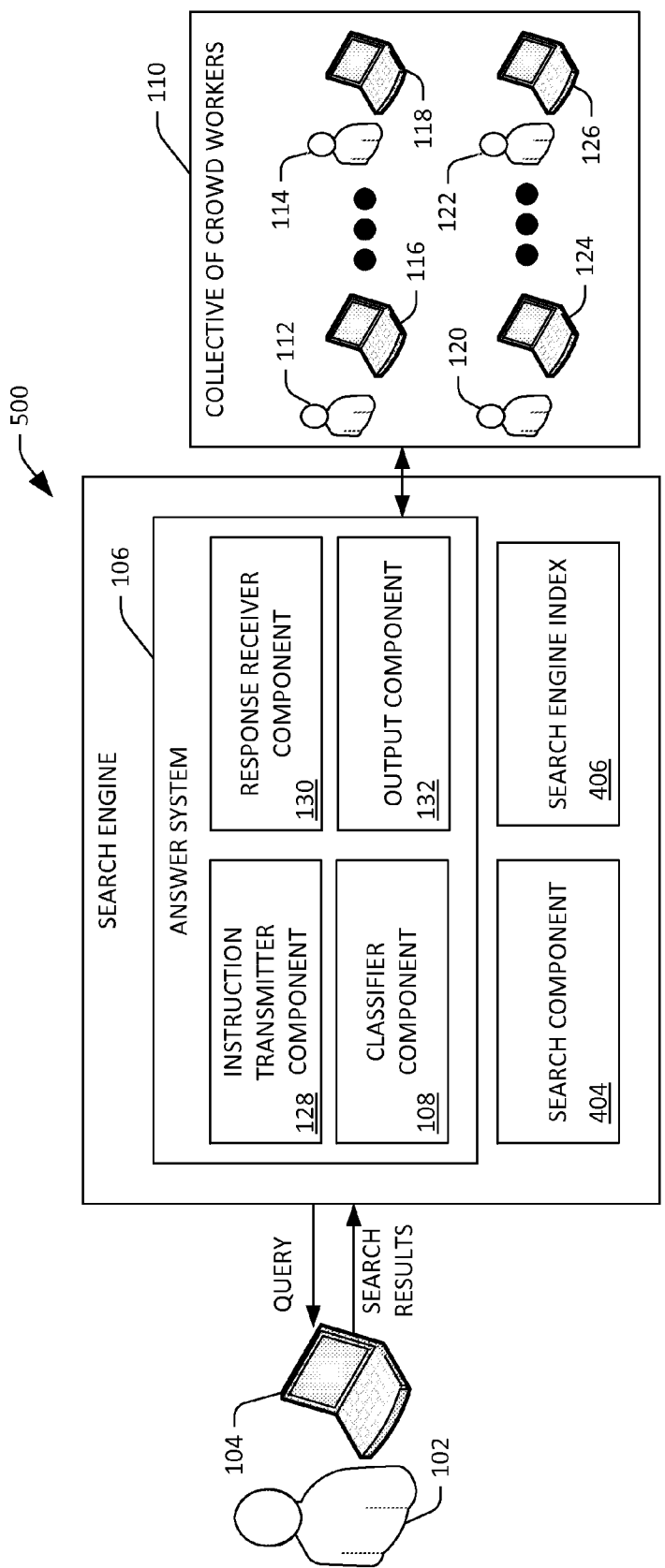
FIG. 5 is a functional block diagram of an exemplary system that facilitates providing to a user of a search engine, in real-time or near real-time, a crowd-sourced answer to an information need of the user.

Now referring to FIG. 5, an exemplary search engine 500 that can provide search results that include an answer generated by the collective of crowd workers 110 in real-time or near real-time is illustrated. The user 102 of the computing device 104 submits a query to the search engine 500. The search engine 500 includes the answer system 106. The search component 404 receives the query and executes a search over the search engine index 406 to locate web pages that are believed to be relevant to the query set forth by the user 102. The search component 404 may then (immediately) output the search results on a SERP to the computing device 104 of the user 102.

Additionally, the classifier component 108 of the answer system 106 can receive the query and determine if the query represents an information need that is desirably answered by the collective of crowd workers 110. As noted above, the classifier component 108 can determine if it is desirable for the collective of crowd workers 110 to provide an answer based upon various features corresponding to the query. Such features can include whether the query is written in the form of a question, whether the classifier component 108 finds the query to be time-critical in nature, whether the query is believed to be searching for a fact or short list, etc. If the classifier component 108 determines that the query does not represent an information need that is desirably answered by the collective of crowd workers 110, then the user 102 can review the URLs in the SERP to satisfy the information need.

If, however, the classifier component 108 deems that the query submitted by the user 102 represents an information need that is desirably answered by the collective of crowd workers 110, then the classifier component 108 can output an indication to the computing device 104 that the collective of crowd workers 110 are being employed to generate a crowd-sourced answer. Such indication can be displayed on the SERP, transmitted in the form of an instant message, or other suitable manner of notifying the user 102 that the collective of crowd workers 110 are being employed to generate the crowd-sourced answer.

Responsive to the classifier component 108 deeming that the query submitted by the user 102 represents an information need that is desirably answered by the collective of crowd workers 110, the instruction transmitter component 128 can transmit the query, corresponding information, and first instructions to the first plurality of computing devices 116-118 operated by the respective first plurality of crowd workers 112-114. The corresponding information can include algorithmically generated answers, context pertaining to the user 102 (e.g., information from a public profile of the user 102, information explicitly provided by the user 102, at least one web page included in the SERP, . . . ). The first instructions instruct the first plurality of crowd workers 112-114 to generate proposed answers for the information need of the user 102. Using the first plurality of computing devices 116-118, the first plurality of crowd workers 112-114 submit the proposed answers to the answer system 106.

The response receiver component 130 receives such proposed answers, and responsive to the response receiving component 130 receiving the proposed answers, the instruction transmitter component 128 transmits the answers, the query, (optionally) the corresponding information, and second instructions to the second plurality of computing devices 124-126 operated by the respective second plurality of crowd workers 120-122. The second instructions instruct the second plurality of crowd workers 120-122 to submit votes to the answer system 106 as to which of the answers generated by crowd workers in the first plurality of crowd workers 112-114 best answers the information need of the user 102 (as represented by the query). The crowd workers in the second plurality of crowd workers 120-122 operate the respective second plurality of computing devices 124-126 to submit the votes to the answer system 106. The response receiver component 130 receives the votes, tabulates the votes, and selects the answer that receives the highest number of votes as a final answer. The output component 132 can output the final answer to the computing device 104 of the user 102. As mentioned above, the SERP presented to the user 102 can be updated to include the final answer, such that the final answer is shown inline with search results on the SERP previously shown to the user. Additionally or alternatively, the output component 132 can transmit the final answer to an account of the user 102, such as an email account, an instant messaging account, a social networking account, etc. Transmitting the final answer to an account of the user 102 may be particularly beneficial when the user 102 is, for some reason, in a hurry, and wishes to perform another task while the final answer is being generated by the answer system 106.

Figure 6:
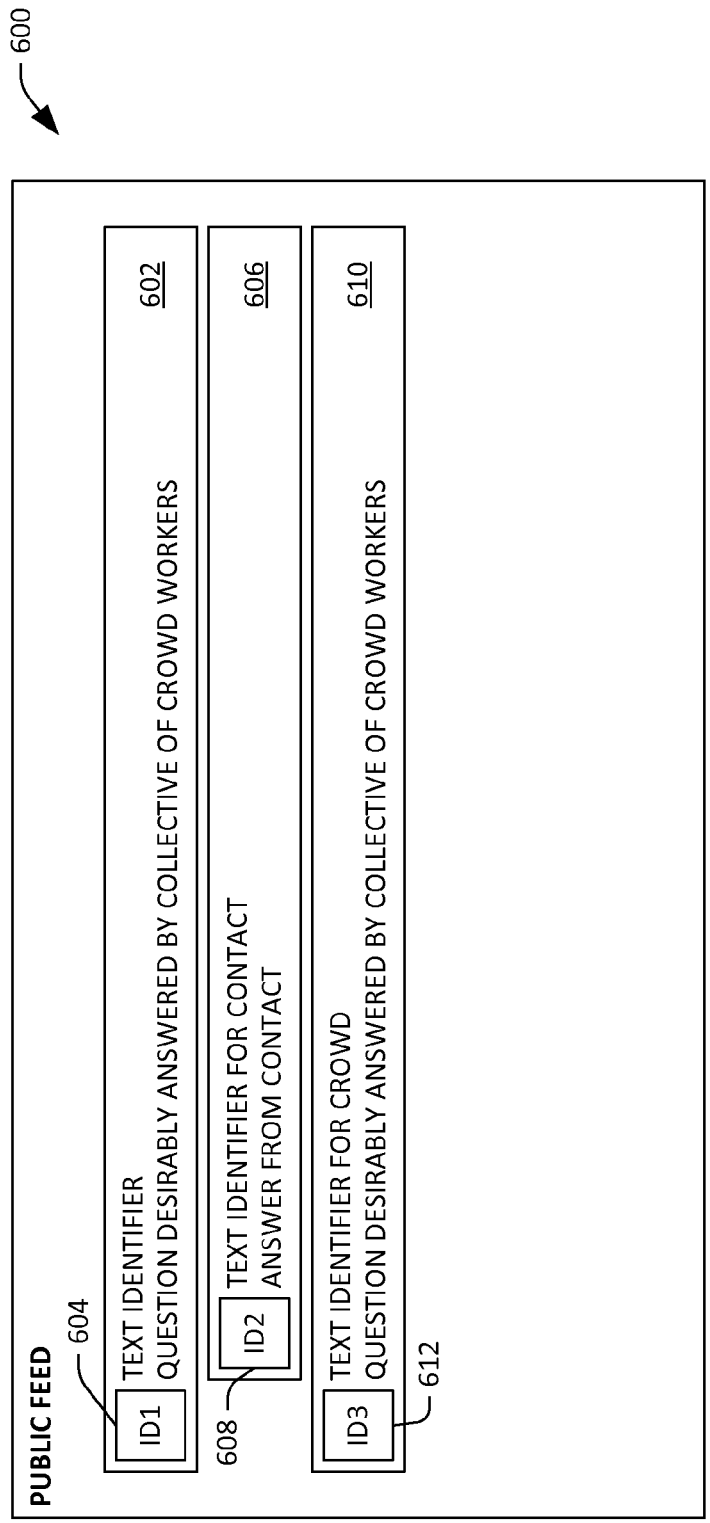
FIG. 6 is an exemplary graphical user interface that includes a crowd-sourced answer to a question posted on a public feed of a social networking application.

Turning now to FIG. 6, an exemplary graphical user interface 600 of a public feed of a social networking application is illustrated. The public feed includes a message 602 that is posted by a user of the social networking application. The message 602 can include a graphical icon 604 (such as an avatar) that identifies the poster of the message, as well as a text identifier (such as a handle) that further identifies such poster. The message 602 also includes a question submitted by the poster of the message 602.

In the example graphical user interface 600, a second message 606 is posted by a contact (e.g., a follower) of the poster of the first message 602. The second message 606 includes a second graphical icon 608 that identifies a poster of the second message, a text identifier that further identifies the poster of the second message, as well as, for instance, an answer to the question included in the first message 602.

The question in the first message 602 and (optionally) the answer in the second message 606 can be transmitted to crowd workers in the collective of crowd workers 110. The collective of crowd workers 110 can generate an answer, which can be presented to the poster of the first message 602 as a portion of the public feed in correspondence with the first message 602. For instance, the public feed can include a third message 610 that comprises a graphical icon 612 that identifies the collective of crowd workers 110 (e.g., identifies that an answer in the third message 610 is a crowd-sourced answer) as well as a text identifier that further identifies the collective of crowd workers 110. The third message 610 also includes an answer to the question set forth in the first message 602.

Figure 7:
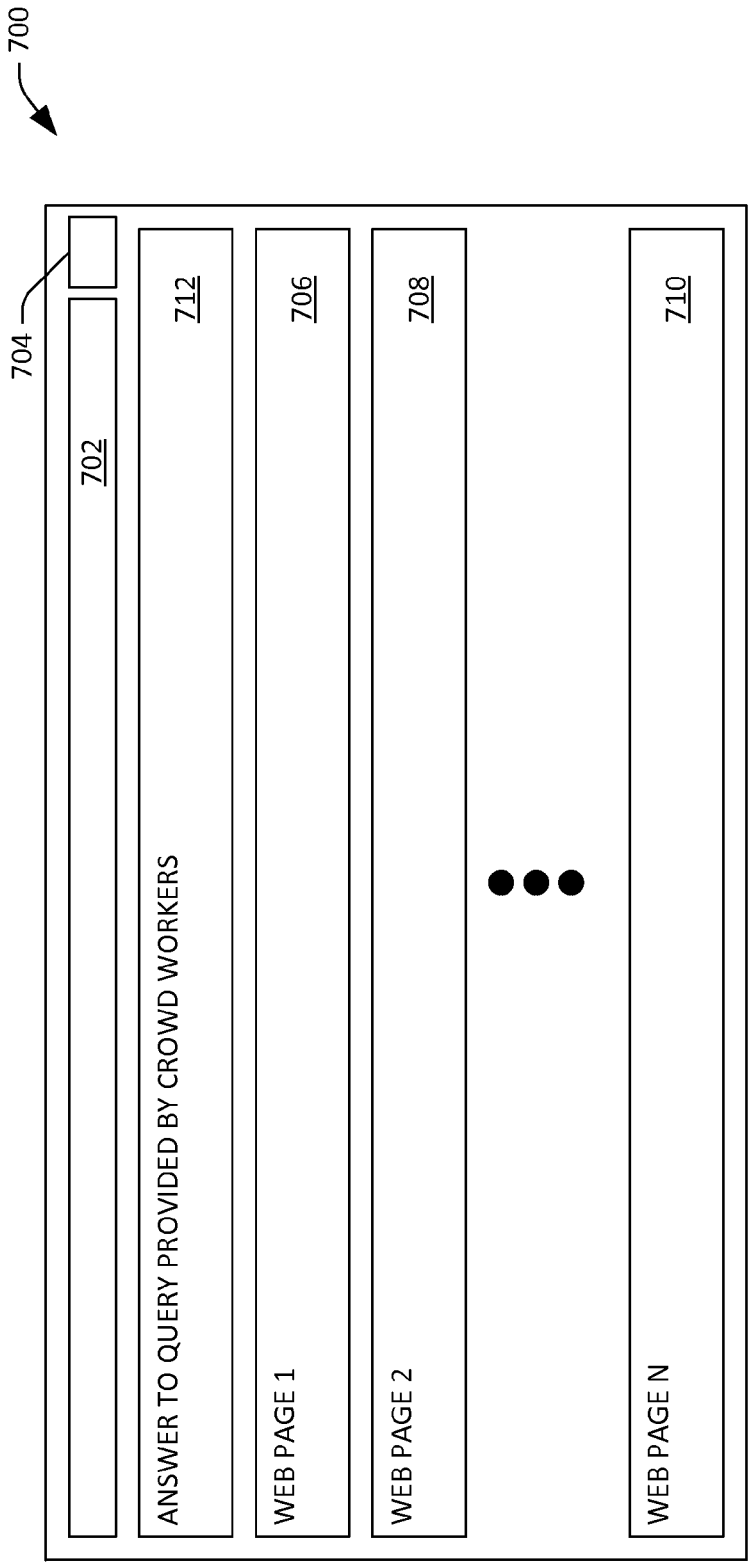
FIG. 7 is a graphical user interface of an exemplary search engine results page that includes a crowd-sourced answer.

With reference now to FIG. 7, a graphical user interface 700 of a SERF output by a search engine is illustrated. The graphical user interface 700 includes a query field 702, wherein a user can set forth a query to the search engine by way of the query field 702. The graphical user interface 700 further includes a button 704, wherein, in an example, a query entered into the query field 702 is transmitted to the search engine responsive to the user selecting the button 704.

The graphical user interface 700 includes a plurality of search results presented by the search engine upon executing a search over a search engine index based upon the query. The search results include a plurality of web page identifiers 706-710. The search results also include an answer 712 generated by the collective of crowd workers 110 in a manner described above. The answer 712 can be highlighted to indicate that it is a crowd-sourced answer (rather than a conventional search result).

FIGS. 8-13 illustrate exemplary methodologies relating to generating crowd-sourced answers to information needs of users. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 8:
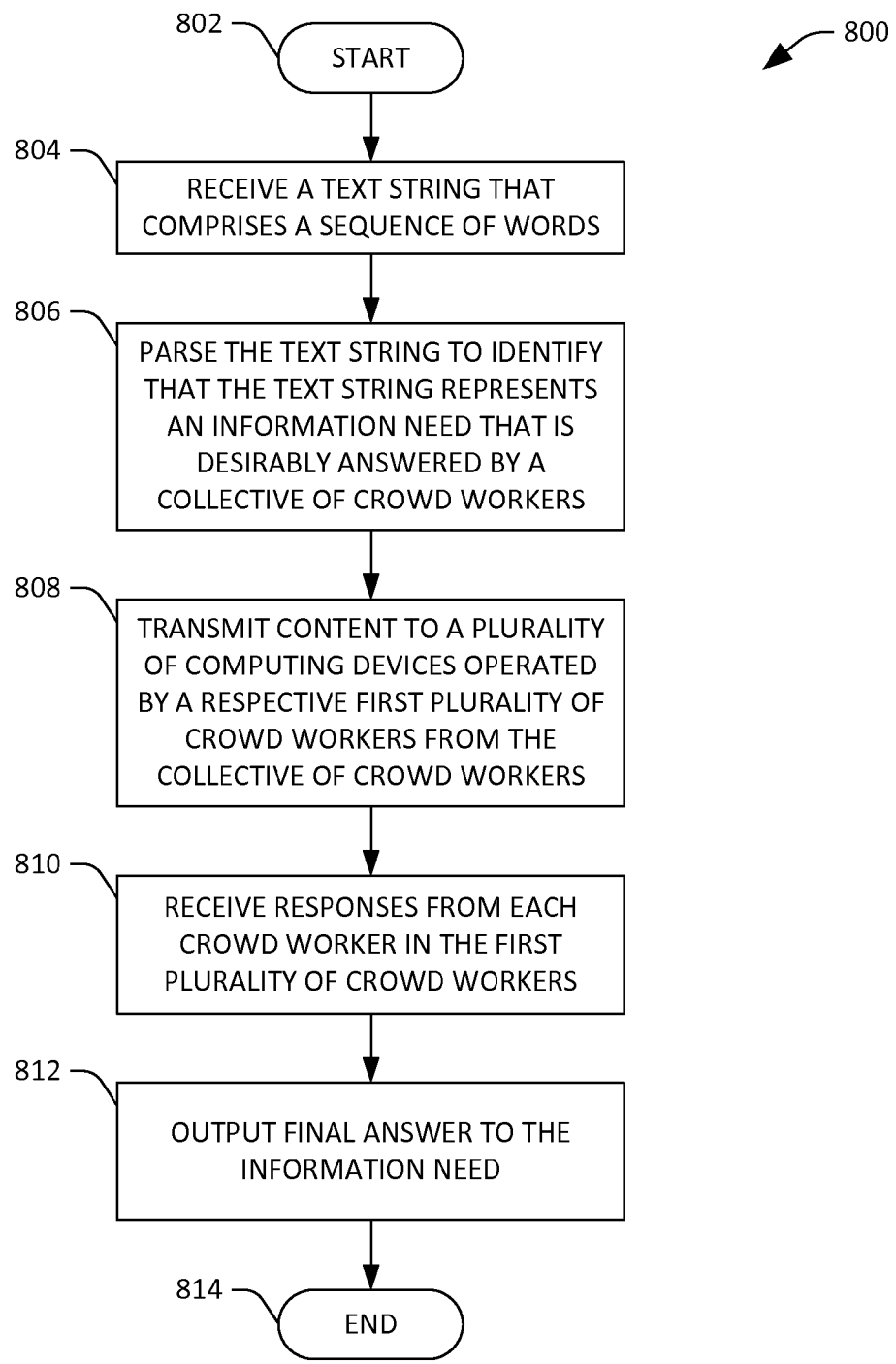
FIG. 8 is a flow diagram that illustrates an exemplary methodology for outputting a crowd-sourced answer to an information need of a user.

Turning now to FIG. 8, an exemplary methodology 800 for outputting an answer generated by a collective of crowd workers is illustrated. The methodology 800 starts at 802, and at 804 a text string that comprises a sequence of words is received. The text string can be from a query or message set forth by a user through utilization of a keyboard. In another example, the text string may be a transcription of a query or message audibly set forth by the user. At 806, the text string is parsed to identify that the text string represents an information need that is desirably answered by a collective of crowd workers. For example, the text string can be parsed to identify that the text string includes a question, and that the question is desirably answered by a collective of crowd workers.

At 808, responsive to the identifying that the information need is desirably answered by the collective the crowd workers, content can be transmitted to a first plurality of computing devices operated by a respective first plurality of crowd workers from amongst the collective of crowd workers. The content includes first instructions to be followed by each crowd worker in the first plurality of crowd workers, wherein the first instructions direct each crowd worker in the first plurality of crowd workers to perform a same task. For instance, such task may be to generate a proposed answer for the information need.

At 810, responses from each crowd worker to the task are received, and at 812 a final answer to the information need is output based at least in part upon the respective responses to the task from each crowd worker in the first plurality of crowd workers. The methodology 800 completes at 814.

Figure 9:
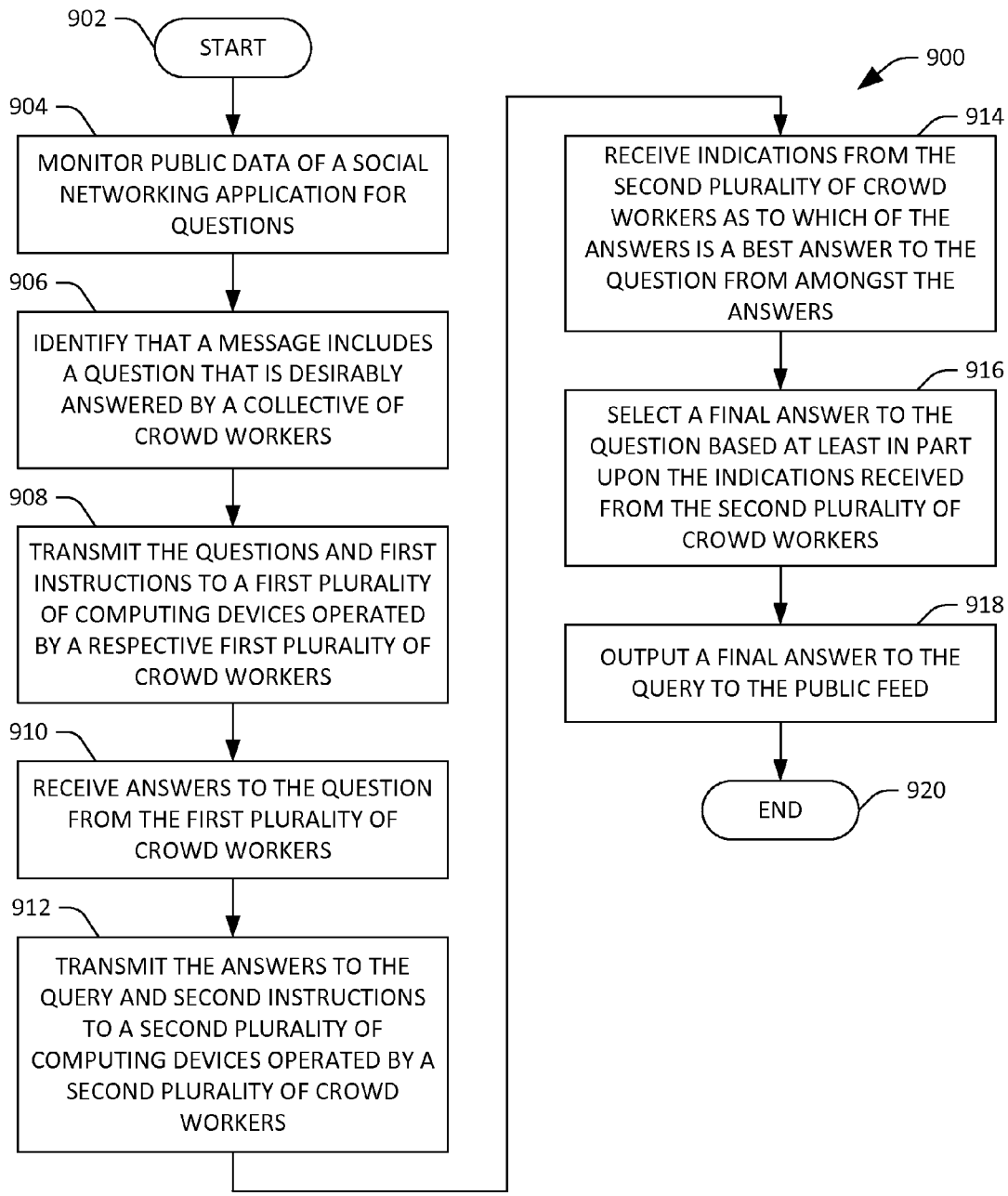
FIG. 9 is a flow diagram that illustrates an exemplary methodology for outputting a crowd-sourced answer to an information need expressed by a user in a message posted using a social networking application.

Turning now to FIG. 9, an exemplary methodology 900 for outputting an answer to a question submitted by way of a social networking application is illustrated. The methodology 900 starts at 902, and at 904, public data of a social networking application is monitored for questions posted by users of the social networking application. At 906, a message is identified as including a question that is desirably answered by a collective of crowd workers. Such message may be a status update or some other suitable message. At 908, the question and first instructions are transmitted to a first plurality of computing devices operated by a respective first plurality of crowd workers. Other supplemental information may also be provided to the first plurality of crowd workers.

At 910, proposed answers to the question are received from each crowd worker in the first plurality of crowd workers. In other words, every crowd worker submits a proposed answer to the question. At 912, the proposed answers submitted by crowd workers in the first plurality of crowd workers are transmitted together with second instructions to a second plurality of computing devices operated by a respective second plurality of crowd workers. The second instructions instruct crowd workers in the second plurality of crowd workers to vote on which proposed answer is the best answer to the question. At 914, indications are received from the second plurality of crowd workers as to which of the answers is the best answer to the question from amongst the proposed answers set forth by crowd workers in the first plurality of crowd workers.

At 916, a final answer to the question is selected based at least in part upon the indications received from the second plurality of crowd workers at 914. For example, the answer receiving the most votes by crowd workers in the second plurality of crowd workers can be selected as the final answer. At 918, a final answer to the query is output as a portion of public data in the social networking application. The methodology 900 completed 920.

Figure 10:
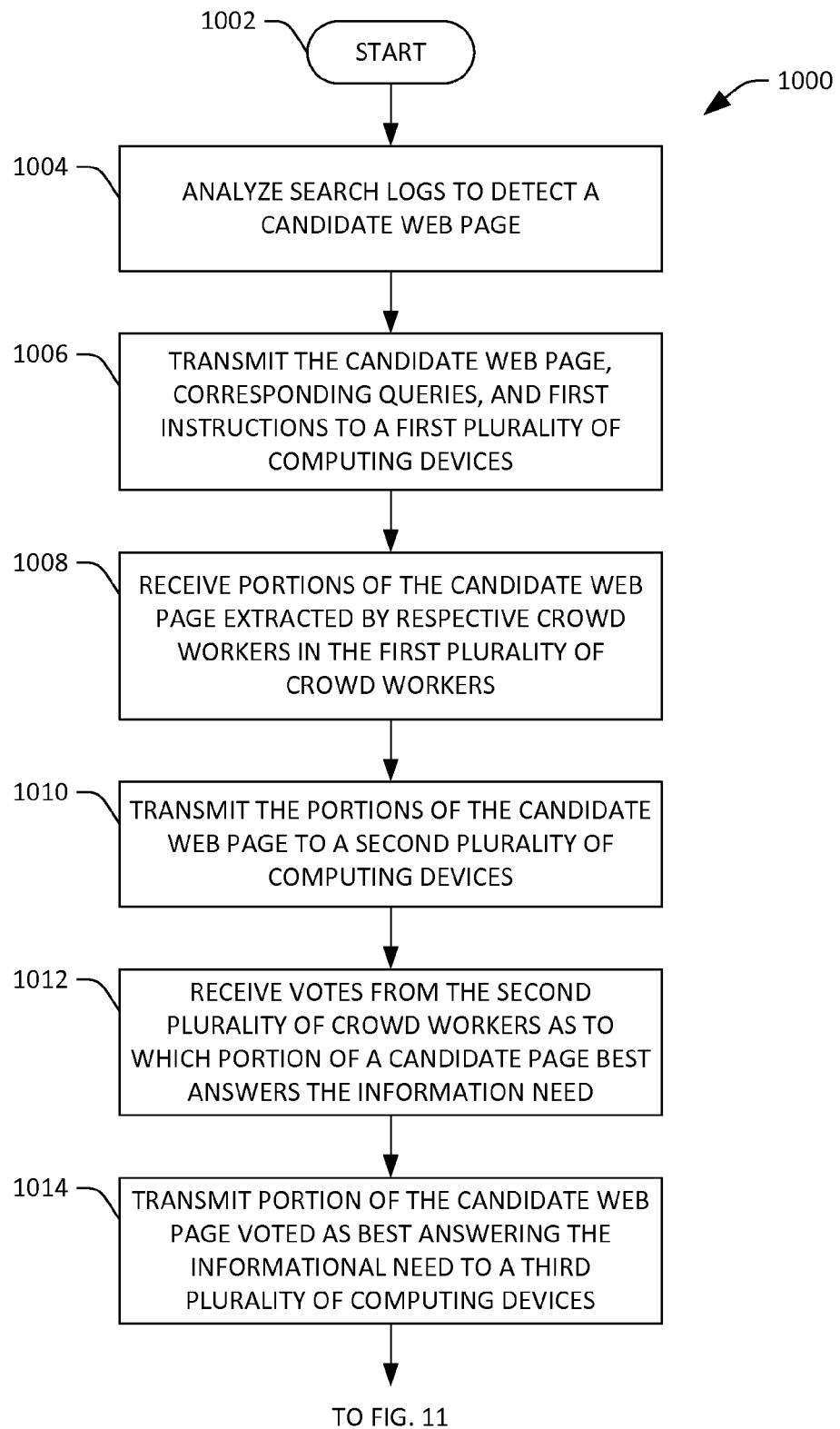
FIGS. 10 and 11 illustrate an exemplary methodology for generating crowd-sourced answers to information needs of users of a search engine.
Figure 11:
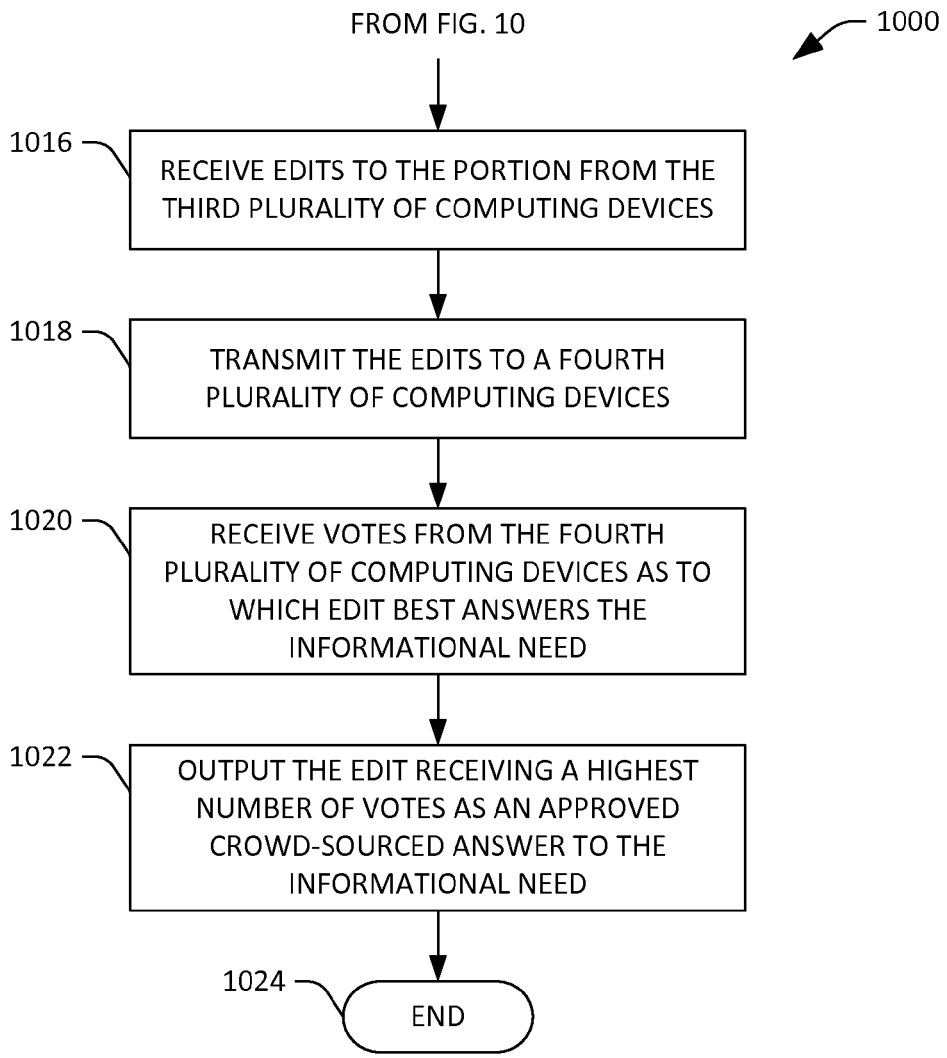

Referring collectively to FIGS. 10 and 11, an exemplary methodology 1000 for generating crowd-sourced answers to information needs identified through analysis of a search log is illustrated. The methodology 1000 starts at 1002, and at 1004, search logs of a search engine are analyzed to identify a candidate web page. As noted above, a candidate web page is a web page that is often a destination web page for queries that have certain features (e.g., include question words). At 1006, the candidate web page, queries corresponding thereto, and first instructions are transmitted to a first plurality of computing devices operated by a first plurality of crowd workers. The first instructions instruct crowd workers in the first plurality of crowd workers to extract a portion of the candidate web page that a respective crowd worker believes to best answer the information need represented by the candidate web page and corresponding queries. At 1008, portions of the candidate web page extracted by respective workers in the first plurality of crowd workers are received from the first plurality of computing devices. While the above refers to extracting portions of a candidate web page, it is to be understood that other resources may be provided, and content can be extracted from such resources in connection with providing a crowdsourced answer to an information need.

At 1010, the portions submitted by the first plurality of crowd workers, second instructions, and the corresponding queries are transmitted to a second plurality of computing devices operated by a respective second plurality of crowd workers. The second instructions instruct the second plurality of crowd workers to vote on which portion best answers the information need represented by the queries. The second plurality of crowd workers operate the respective second plurality of computing devices to submit their votes as to which portion of the candidate web page best answers the information need.

At 1012, the votes submitted by the second plurality of crowd workers are received from the second plurality of computing devices. At 1014, the portion of the candidate web page receiving the highest number of votes and third instructions are transmitted to a third plurality of computing devices operated by a respective third plurality of crowd workers. The third instructions instruct the third plurality of crowd workers to edit the portion of the candidate web page in accordance with defined criteria (e.g., the portion is to be shortened to include no more than fifteen words). The third plurality of crowd workers can utilize the respective third plurality of computing devices to submit edits.

At 1016, the edits submitted by the third plurality of crowd workers are received from the third plurality of computing devices. At 1018, responsive to receiving the edits, the edits and fourth instructions are transmitted to a fourth plurality of computing devices operated by a respective fourth plurality of crowd workers. The fourth instructions instruct the fourth plurality of crowd workers to submit votes at to which edit represents a best final answer to the information need. The fourth plurality of crowd workers operate the fourth plurality of computing devices to submit such votes.

At 1020, the votes are received from the fourth plurality of computing devices, and at 1022, the edit receiving the highest number of votes is output as an approved crowd-sourced answer to the information need. Optionally, while not shown, other crowd workers can be instructed to submit a short title to the approved answer to assign a short title to the crowd-sourced answer to the information need and such title can be voted on by still other crowd workers.

Figure 12:
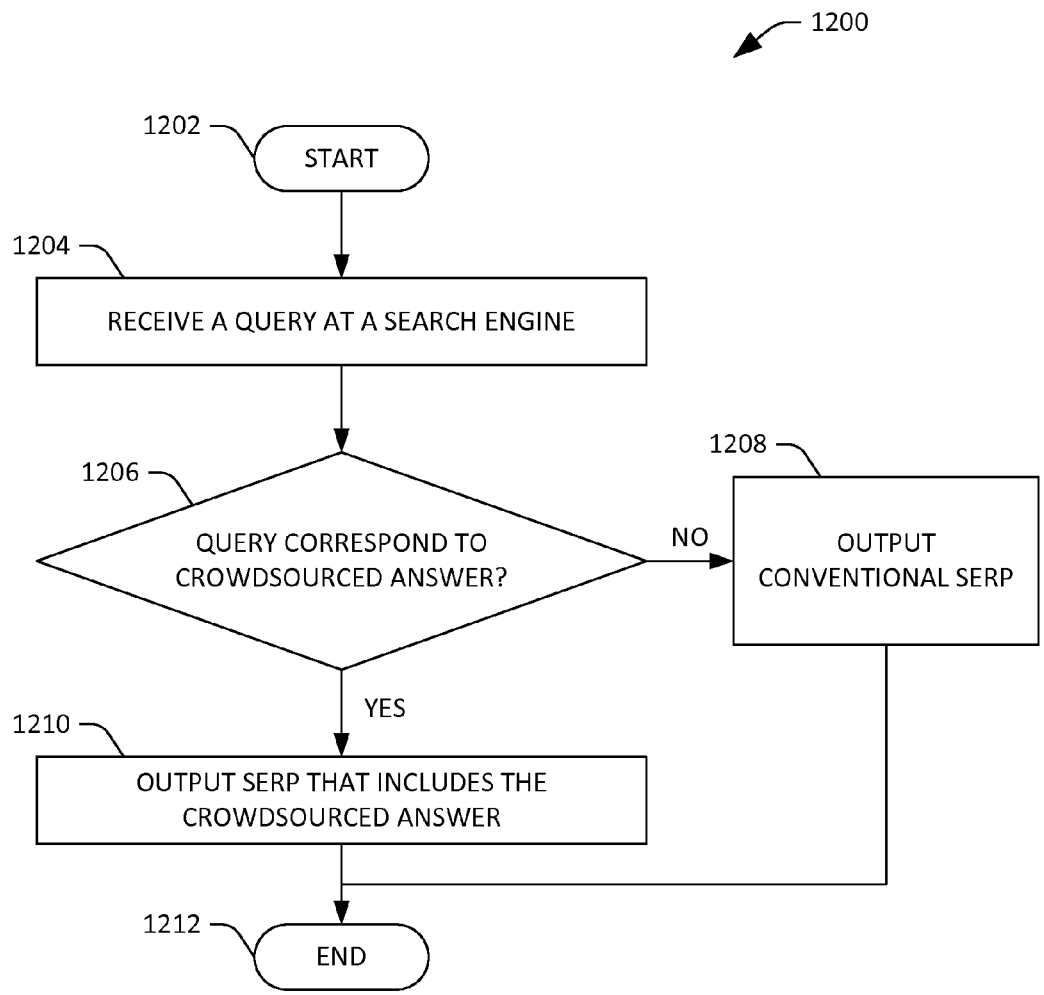
FIG. 12 is a flow diagram that illustrates an exemplary methodology for outputting a search engine results page that includes a crowd-sourced answer.

With reference now to FIG. 12, an exemplary methodology 1200 for outputting search results that include a crowd-sourced answer is illustrated. The methodology 1200 starts at 1202, and at 1204, a query is received at a search engine. At 1206, a determination is made as to whether the query corresponds to a crowd-sourced answer. As noted above, the query can be analyzed to ascertain if it includes particular features, and search results retrieved by the search engine can be analyzed to ascertain if such search results include a web page identified as being a candidate web page.

If the query is not found to correspond to a crowd-sourced answer, then at 1208, a conventional SERP is output to the issuer of the query. If at 1206, however, it is found that the query corresponds to a crowd-sourced answer, then at 1210, a SERP is output that includes a crowd-sourced answer. In such case, the SERP can include conventional web page titles and snippets as well as a crowd-sourced answer positioned inline with the web page titles and snippets. The methodology 1200 completes at 1212.

Figure 13:
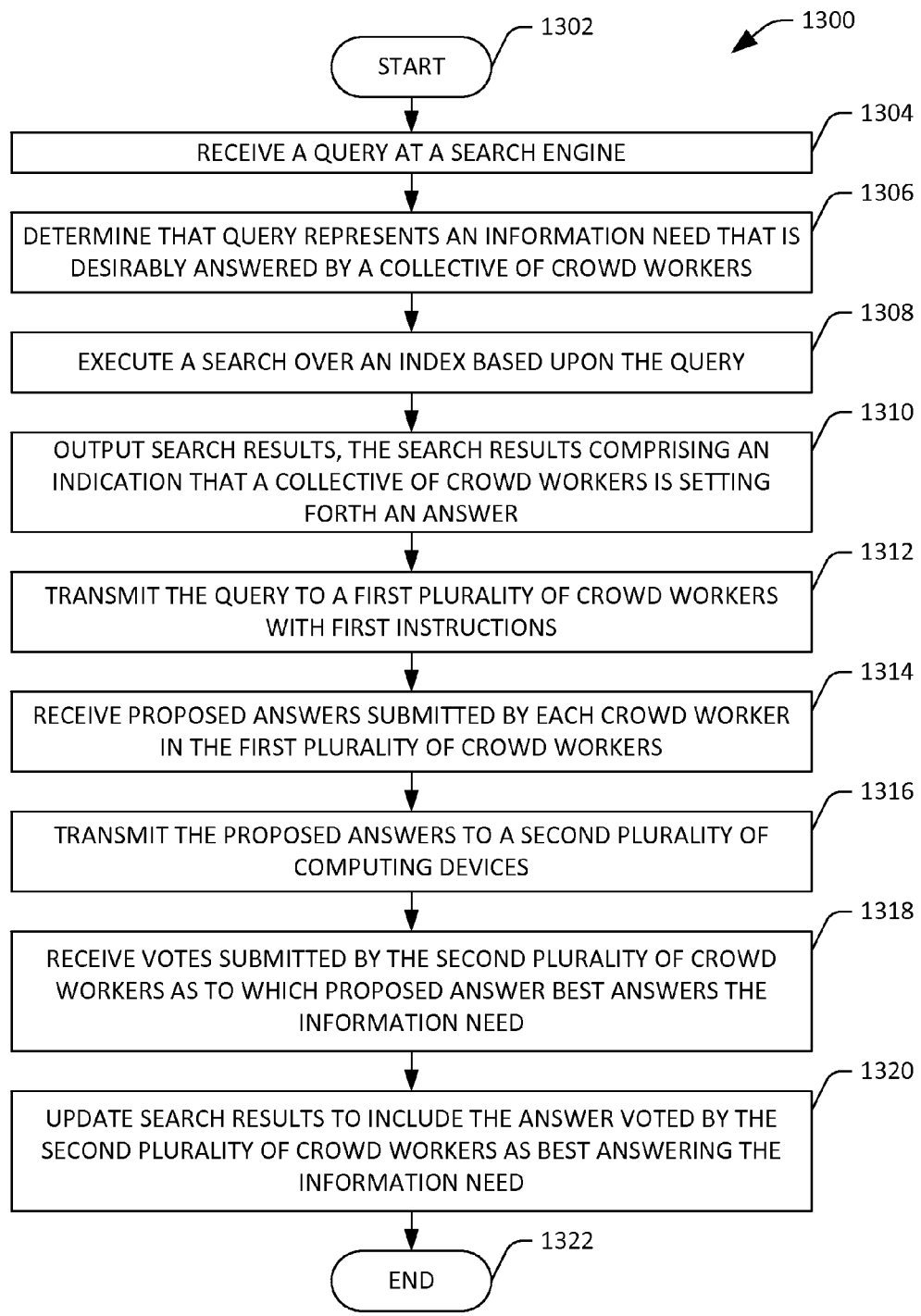
FIG. 13 is a flow diagram that illustrates an exemplary methodology for generating a crowd-sourced answer in response to receipt of a query at a search engine.

Now referring to FIG. 13, an exemplary methodology 1300 that facilitates outputting a crowd-sourced answer responsive to receipt of a query at a search engine is illustrated. The methodology 1300 starts at 1302, and at 1304 a query is received at a search engine. At 1306, it is determined that the query represents an information need that is desirably answered by a collective of crowd workers. This determination can be made based upon features corresponding to the query, a determination that the query is time-critical in nature, etc.

At 1308, a search is executed by a search engine based upon the query. At 1310, search results (conventional) are output based upon the search over the search index, wherein the search results comprise an indication that a collective of crowd workers is generating an answer to the information need of the user. At 1312, the query and first instructions are transmitted to a first plurality of computing devices operated by a respective first plurality of crowd workers. Additionally, supplemental information can be transmitted to the first plurality of computing devices, such as web pages that may include an answer to the information need of the user, information about the user, etc. The first instructions instruct the first plurality of crowd workers to submit proposed answers to the query.

At 1314, the proposed answers are received from computing devices operated by each crowd worker in the first plurality of crowd workers. At 1316, the proposed answers and second instructions are transmitted to a second plurality of computing devices operated by a respective second plurality of crowd workers. The second instructions instruct crowd workers in the second plurality of crowd workers to vote on which proposed answer proffered by crowd workers in the first plurality of crowd workers best answers the information need of the user represented by the query.

At 1318, votes from the second plurality of crowd workers are received as to which proposed answer provided by crowd workers in the first plurality of crowd workers best answers the information need. At 1320, search results are updated to include the answer voted by the second plurality of crowd workers as best answering the information need. The methodology 1300 completes 1322.

Figure 14:
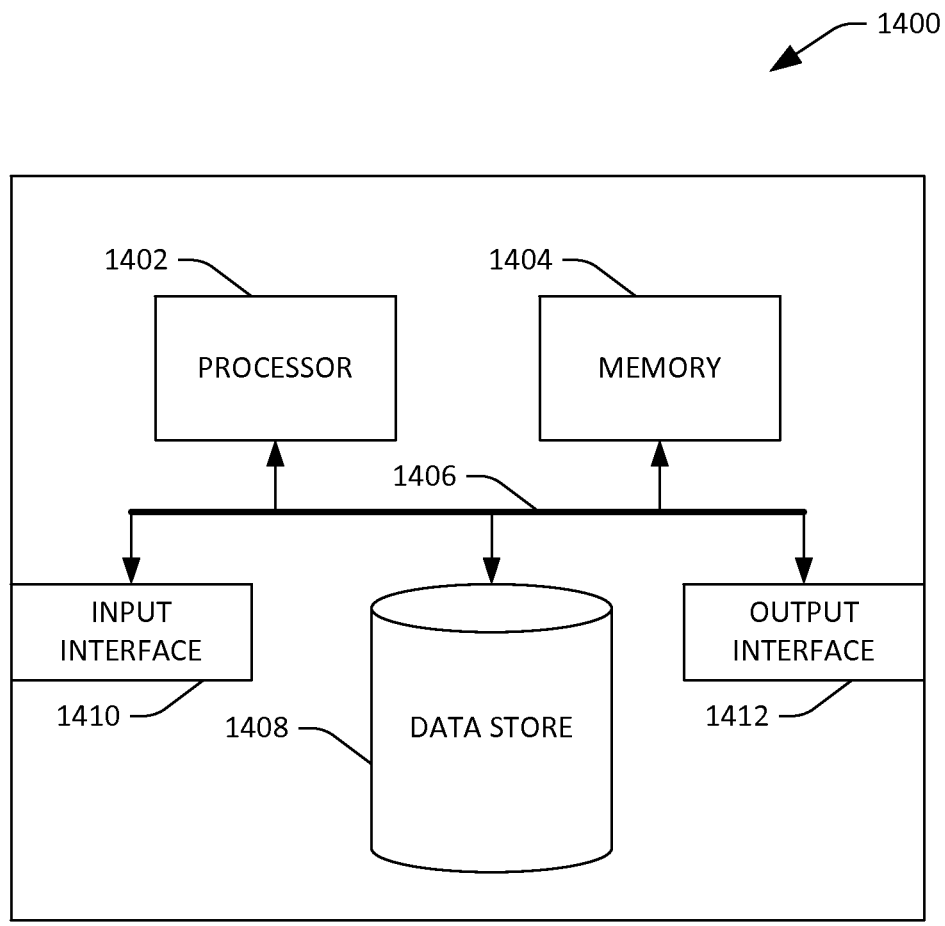
FIG. 14 is an exemplary computing system.

Referring now to FIG. 14, a high-level illustration of an exemplary computing device 1400 that can be used in accordance with the systems and methodologies disclosed herein is illustrated. For instance, the computing device 1400 may be used in a system that generates crowd-sourced answers responsive to a query being submitted to a search engine. By way of another example, the computing device 1400 can be used in a system that generates crowd-sourced answers to questions posted in messages of a social networking application. The computing device 1400 includes at least one processor 1402 that executes instructions that are stored in a memory 1404. The instructions may be, for instance, instructions for implementing functionality described as being carried out by one or more components discussed above or instructions for implementing one or more of the methods described above. The processor 1402 may access the memory 1404 by way of a system bus 1406. In addition to storing executable instructions, the memory 1404 may also store search trails, proposed answers, instructions, and so forth.

The computing device 1400 additionally includes a data store 1408 that is accessible by the processor 1402 by way of the system bus 1406. The data store 1408 may include executable instructions, instructions, proposed answers, votes, etc. The computing device 1400 also includes an input interface 1410 that allows external devices to communicate with the computing device 1400. For instance, the input interface 1410 may be used to receive instructions from an external computer device, from a user, etc. The computing device 1400 also includes an output interface 1412 that interfaces the computing device 1400 with one or more external devices. For example, the computing device 1400 may display text, images, etc. by way of the output interface 1412.

It is contemplated that the external devices that communicate with the computing device 1400 via the input interface 1410 and the output interface 1412 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 1400 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 1400 may be a distributed system. Thus, for instance, several devices may be in communication by way of a network connection and may collectively perform tasks described as being performed by the computing device 1400.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A method, comprising:
  receiving, at a computing device, a text string that comprises a sequence of words;
  parsing the text string;
  based at least in part upon the parsing of the text string, identifying that the text string represents an information need that is to be answered by a collective of crowd workers;
  responsive to the identifying that the text string represents an information need that is to be answered by the collective of crowd workers, transmitting content to a first plurality of computing devices operated by a respective first plurality of crowd workers from amongst the collective of crowd workers, the content comprising first instructions that instruct each crowd worker in the first plurality of crowd workers to perform a same task;
  receiving respective responses to the task from each crowd worker in the first plurality of crowd workers; and
  outputting an answer to the information need based upon the responses to the task from the first plurality of crowd workers.

2. The method of claim of claim 1, wherein the text string comprises a query submitted to a search engine, the method further comprising:
  responsive to identifying that the query represents the information need that is to be answered by the collective of crowd workers, identifying at least one resource related to the information need; and
  transmitting the at least one resource to each crowd worker in the first plurality of crowd workers, wherein the first instructions instruct each crowd worker in the first plurality of crowd workers to generate a proposed answer based upon the query and the at least one resource.

3. The method of claim 2, wherein the first instructions instruct each crowd worker in the first plurality of crowd workers to generate the proposed answer by extracting content from the at least one resource.

4. The method of claim 3, wherein the at least one resource is a resource retrieved by executing a search over a search engine index based upon the query, the method further comprising:
  receiving portions of the resource extracted therefrom by respective crowd workers in the first plurality of crowd workers;
  transmitting the portions, the query, and second instructions to a second plurality of computing devices operated by a second plurality workers, the second instructions requesting each crowd worker in the second plurality of crowd workers to set forth an indication of a preference as to which option of several options best answers the information need, the several options comprising the portions of the resource extracted therefrom by respective crowd workers in the first plurality of crowd workers;
  receiving indications of preferences from the second plurality of computing devices; and
  outputting the answer based at least in part upon the indications of the preferences.

5. The method of claim 1, wherein the text string is received from a public feed of a social networking application, and wherein the text string comprises an explicit or implied question.

6. The method of claim 5, wherein the task is for each crowd worker from the first plurality of crowd workers to submit a respective proposed answer to the question.

7. The method of claim 6, further comprising:
  responsive to receiving proposed answers to the question submitted by the first plurality of crowd workers, transmitting the proposed answers and second instructions to a second plurality of computing devices operated by a respective second plurality of crowd workers, the second instructions instructing each crowd worker in the second plurality of crowd workers to submit a respective vote as to which of several options best answers the information need, the several options comprising the proposed answers; and
  receiving votes submitted by the second plurality of crowd workers, wherein the answer is output based at least in part upon the votes.

8. The method of claim 1, wherein the identifying that the text string represents an information need that is to be answered by the collective of crowd workers comprises:
  determining that the text string comprises at least one predefined feature;
  responsive to determining that the text string comprises the at least one predefined feature, transmitting at least a portion of the text string and second instructions to a computing device of a crowd worker from the collective of crowd workers, the second instructions instructing the crowd worker to indicate whether or not the information need is answerable by the collective of crowd workers; and
  receiving a response from the crowd worker that the information need is answerable by the collective of crowd workers.

9. The method of claim 1, wherein identifying that the text string represents an information need that is to be answered by the collective of crowd workers comprises identifying that the text string comprises a query that is time-critical in nature.

10. The method of claim 1, wherein the outputting of the answer to the information need comprises including the answer to the information need in a search engine results page, the search engine results page comprising a ranked list of URLs, and wherein the answer is presented in the search engine results page to visually differentiate the answer from URLs in the ranked list of URLs.

11. The method of claim 10, wherein the answer is displayed above the URLs in the ranked list of URLs.

12. A system, comprising:
  a processor; and
  memory storing instructions that, when executed by the processor, cause the processor to perform acts comprising:
    classifying a text string as representing an information need that is to be answered by a collective of crowd workers based upon at least one word in the text string;
    responsive to classifying the text string, transmitting the text string and first instructions to a first plurality of computing devices operated by a first plurality of crowd workers in the collective of crowd workers, the first instructions instructing each crowd worker in the first plurality of crowd workers to perform a same task with respect to the information need;

receiving responses to the task submitted by the first plurality of crowd workers; and outputting an answer to the information need based at least in part upon the responses to the task.

13. The system of claim 12, the acts performed by a search engine, wherein the text string comprises a query submitted to the search engine.

14. The system of claim 12, wherein the text string comprises a question included in a message posted to a feed of a social networking application, the acts further comprising analyzing the feed and identifying that the message includes the question, wherein the question is received responsive to identifying that the message includes the question.

15. The system of claim 12, wherein classifying the text string as representing an information need that is to be answered by the collective of crowd workers is based at least in part upon a non-alphanumerical character being included in the text string.

16. The system of claim 12, wherein text string comprises a question, and wherein the task is to submit a proposed answer to the question.

17. The system of claim 16, the acts further comprising:

receiving proposed answers to the question from the first plurality of computing devices;

responsive to receiving the proposed answers, transmitting the question, the proposed answers, and second instructions to a second plurality of computing devices operated by a second plurality of crowd workers, the second instructions instructing each crowd worker in the second plurality of crowd workers to submit a vote as to which proposed answer best answers the information need, and wherein outputting the answer to the information need is based at least in part upon votes submitted by the second plurality of crowd workers.

18. The system of claim 12, the acts further comprising further comprising tracking payment to be provided to each crowd worker in the first plurality of crowd workers for their respective responses.

19. The system of claim 12, wherein outputting an answer to the information need comprises outputting the answer to a public feed of a social networking application, the answer displayed in the public feed in correspondence with a message that includes the text string.

20. A computer-readable storage medium comprising instructions that, when executed by a processor, cause the processor to perform acts comprising:

monitoring a public feed of a social networking application for questions included in messages posted to the public feed;

determining that a message posted to the public feed by a user of the social networking application comprises a question;

determining that the message posted to the public feed by the user of the social networking application comprises a hash tag;

identifying that the question is to be answered by a collective of crowd workers based upon the determining that the message comprises the question and the determining that the message comprises the hash tag;

responsive to identifying that the question is to be answered by the collective of crowd workers, transmitting the question and first instructions to a first plurality of computing devices operated by a respective first plurality of crowd workers, the first instructions instructing each crowd worker in the first plurality of crowd workers to generate a respective proposed answer to the question;

receiving proposed answers to the question submitted by the first plurality of crowd workers;

responsive to receiving the proposed answers to the question, transmitting the proposed answers to the question and second instructions to a second plurality of computing devices operated by a respective second plurality of crowd workers, the second instructions instructing each crowd worker in the second plurality of crowd workers to submit a vote as to which of the proposed answers best answers the question;

receiving votes submitted by the second plurality of crowd workers;

selecting a final answer to the question based at least in part upon the votes; and outputting the final answer to the question to the public feed.

* * * * *